US008127985B1

(12) United States Patent
Kolinski-Schultz

(10) Patent No.: US 8,127,985 B1
(45) Date of Patent: Mar. 6, 2012

(54) AUTOMATED BANKING MACHINE OPERATED RESPONSIVE TO DATA BEARING RECORDS

(75) Inventor: David E. Kolinski-Schultz, Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 491 days.

(21) Appl. No.: 12/317,781

(22) Filed: Dec. 29, 2008

Related U.S. Application Data

(60) Provisional application No. 61/009,889, filed on Jan. 2, 2008.

(51) Int. Cl.
*G06K 5/00* (2006.01)

(52) U.S. Cl. ......................... 235/380; 235/375; 235/379

(58) Field of Classification Search .................. 235/375, 235/379, 380
See application file for complete search history.

(56) References Cited

U.S. PATENT DOCUMENTS

| | | | | |
|---|---|---|---|---|
| 3,957,173 | A * | 5/1976 | Roudebush | 221/15 |
| 4,321,672 | A * | 3/1982 | Braun et al. | 705/42 |
| 4,567,358 | A * | 1/1986 | Takamatsu et al. | 235/379 |
| 4,754,126 | A * | 6/1988 | Caldwell | 235/379 |
| 5,563,393 | A * | 10/1996 | Coutts | 235/379 |
| 5,642,922 | A * | 7/1997 | Ramachandran et al. | 312/7.2 |
| 5,788,348 | A * | 8/1998 | Ramachandran et al. | 312/223.1 |
| 5,799,288 | A * | 8/1998 | Tanaka et al. | 705/43 |
| 5,880,444 | A * | 3/1999 | Shibata et al. | 235/379 |
| 5,897,625 | A * | 4/1999 | Gustin et al. | 705/43 |
| 5,984,178 | A * | 11/1999 | Gill et al. | 235/379 |
| 5,987,439 | A * | 11/1999 | Gustin et al. | 705/43 |
| 6,010,065 | A * | 1/2000 | Ramachandran et al. | 235/379 |
| 6,053,405 | A * | 4/2000 | Irwin et al. | 235/375 |
| 6,279,826 | B1 * | 8/2001 | Gill et al. | 235/379 |
| 6,328,208 | B1 * | 12/2001 | Artino et al. | 235/379 |
| 6,379,742 | B1 * | 4/2002 | Behm et al. | 427/7 |
| 6,435,408 | B1 * | 8/2002 | Irwin et al. | 235/441 |
| 6,491,215 | B1 * | 12/2002 | Irwin et al. | 235/375 |
| 6,776,337 | B2 * | 8/2004 | Irwin et al. | 235/441 |
| 7,185,804 | B1 * | 3/2007 | Rozlosnik et al. | 235/379 |
| 2002/0053594 | A1 * | 5/2002 | Haney et al. | 235/381 |
| 2002/0147684 | A1 * | 10/2002 | Kirkhope et al. | 705/43 |
| 2003/0042306 | A1 * | 3/2003 | Irwin et al. | 235/441 |

* cited by examiner

*Primary Examiner* — Daniel Hess
*Assistant Examiner* — Paultep Savusdiphol
(74) *Attorney, Agent, or Firm* — Ralph E. Jocke; Daniel D. Wasil; Walker & Jocke

(57) ABSTRACT

An automated banking machine operates responsive to data bearing records. The machine operates to carry out financial transactions for authorized users responsive to data corresponding to financial accounts included on user cards. The banking machine includes a housing bounding an interior area, and an opening into the interior area. The machine includes a card reader, a display, and a cash dispenser. The machine further includes at least one module moveable between an operative position within the housing and a service position. A plurality of position sensors is operative to sense disposed portions of the module and at least one indicator is operative to provide a visual output indicative that the module is in the operative position.

20 Claims, 18 Drawing Sheets

AUTOMATED BANKING MACHINE OPERATED RESPONSIVE TO DATA BEARING RECORDS

CROSS REFERENCE TO RELATED APPLICATION

This Application claims benefit pursuant to 35 U.S.C. §119 (e) of Provisional Application Ser. No. 61/009,889 filed Jan. 2, 2008 the disclosure of which is incorporated herein by reference.

TECHNICAL FIELD

This invention relates to automated banking machines that operate responsive to data read from user cards and which may be classified in U.S. Class 235, Subclass 379.

BACKGROUND ART

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine which enables customers to carry out banking transactions. Banking transactions carried out may include the dispensing of cash, the making of deposits, the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an ATM shall be deemed to include any machine that may be used to electronically carry out transactions involving transfers of value.

Automated banking machines may benefit from improvements.

OBJECTS OF EXEMPLARY EMBODIMENTS

It is an object of an exemplary embodiment to provide a banking system apparatus that is operated responsive to data bearing records.

It is an object of an exemplary embodiment to provide an automated banking machine.

It is a further object of an exemplary embodiment to provide an automated banking machine that has an attractive appearance.

It is a further object of an exemplary embodiment to provide an automated banking machine which is more readily serviced.

It is a further object of an exemplary embodiment to provide an automated banking machine which is more readily manufactured.

It is a further object of an exemplary embodiment to provide an automated banking machine which requires less space for servicing.

It is a further object of an exemplary embodiment to provide an automated banking machine which provides improved access for servicing of internal components.

It is a further object of an exemplary embodiment to provide an automated banking machine which communicates alignment status to a remote location.

It is a further object of an exemplary embodiment to provide a method of servicing an automated banking machine which provides ease and efficiency in servicing serviceable modules.

Further objects of exemplary embodiments will be made apparent in the following Detailed Description of Exemplary Embodiments and the appended claims.

The foregoing objects are accomplished in an exemplary embodiment by an automated banking machine which includes a top housing bounding an interior area. The automated banking machine includes a card reader that reads data from user cards. The data read from user cards is used to enable the machine to operate to carry out financial transactions. The top housing defines a front opening to the interior area. The top housing is mounted above a secure enclosure which is alternatively referred to herein as a chest or safe.

The top housing houses upper banking machine components which may include, for example, a display, the card reader, a receipt printer, a keypad, controllers, actuators, sensors, and others. As used herein "keypad" means input keys whether arranged in a keypad arrangement, keyboard arrangement, or otherwise, and the designations are interchangeable unless expressly identified as being used in a restricted manner. The chest houses lower banking machine components which may include, for example, a currency dispenser mechanism, a currency recycler, a secure deposit holding container and other devices.

The exemplary automated banking machine includes an upper fascia adapted to selectively cover the front opening. The upper fascia includes a rearwardly extending projection which selectively overlies a forward region of the top housing adjacent the front opening to provide an attractive appearance to the machine. In one embodiment, the upper fascia is movable from a first position where the upper fascia covers the front opening, and a second position where the fascia is disposed away from the front opening.

A lower fascia is moveably mounted in supporting connection with the chest. The lower fascia of an exemplary embodiment is selectively movable between a covering position wherein the lower fascia covers a closed chest door and an accessible position where the lower fascia is disposed away from the closed chest door.

The lower fascia includes first and second side extensions so that when the lower fascia is in the covering position the first and second side extensions respectively cover forward portions of the first and second side walls of the chest housing.

In one exemplary embodiment, a rollout tray is moveably mounted in supporting connection with the top housing. Several of the upper banking machine components may be supported on the rollout tray. Additionally, the upper fascia may be mounted to the rollout tray. The rollout tray is movable between a retractable position where the rollout tray is in the interior area and an extended position where the rollout tray extends from the front opening. When the rollout tray is in the retracted position, the upper fascia selectively covers the front opening. When the rollout tray is in the extended position, the banking components mounted thereon may be more readily serviced.

The chest of the exemplary embodiment includes a door selectively movable between a closed position and an open position. In one embodiment, when the lower fascia is in the accessible position and the chest door is in the open position, the lower fascia is adapted to engage the chest door to retain the door in the open position. The lower fascia is adapted for movement away from the chest door in order to release the door from engagement with the lower fascia.

In one exemplary embodiment, the chest housing includes a first opening at a first end thereof and a second opening at a second end thereof. Thus, a master chest housing may be used in either front-load or rear-load machine. A first chest door is an operable door and is adapted for selectively closing the first opening. A locking bolt mechanism is carried on the operable chest door.

A second chest door, not generally used during regular operation of the automated transaction machine, can be adapted to semi-permanently close the second opening. An alternate securing mechanism, such as bolts or other fasteners, may be used to semi-permanently engage the second chest door with the housing. As a result, the functional uses of the first and second chest doors can be selected so that the second chest door becomes the operational door, and the other door is securely mounted in a fixed position.

In one exemplary embodiment, a processor case housing the primary processor for the automated transaction machine, is rotationally mounted in supporting connection with the chest. The processor case is adapted for rotational movement between an operational position and a service position. In the operational position, a first functional side of the processor case faces a side wall of the top housing. In the service position, the first functional side of the processor case faces a front opening of the top housing.

In one embodiment, a rollout tray, supporting several upper banking machine components, is movable from a retracted position to an extended position to allow the processor case to rotate into the service position. In the service position, cables, connections, and other components, including one or more processors, are accessible for servicing.

In another exemplary embodiment, a top housing cover is mounted in slidable supporting relationship with the chest housing. Several upper banking machine components may be supported on a mounting tray equipped with side flanges. The top housing cover may include channel members for slidable engagement with the side flanges. The upper banking machine components may be accessed for servicing by rearwardly sliding the top housing cover. A plurality of fasteners and/or locking mechanisms may be employed to secure the top housing cover in an operational position. Alternately, the mounting tray may include channel members for slidable engagement with flange members carried on the top housing cover.

In another exemplary embodiment, an automated banking machine includes a housing which bounds an interior area and includes an opening to the interior area. A door is moveably mounted in operatively-supported connection with the housing, wherein the door is moveable between a closed position in which the door at least partially covers the opening and an open position. A card reader is in operatively supported connection with the housing, wherein the card reader is operative to read indicia on user cards corresponding to financial accounts. A display and a cash dispenser are in operatively supported connection with the housing. A module is moveably mounted in operatively supported connection with the housing and is moveable between an operative position within the housing and a service position, in which at least a portion of the module extends in the opening. A first position sensor is in operatively supported connection with the housing, and, with the module in the operative position, the first position sensor is operative to sense a first portion of the module. At least one first indicator is in operatively supported connection with the housing and is operative to provide at least one output indicative that the first position sensor senses the module in the operative position.

In a further exemplary embodiment, a second position sensor is in operatively supported connection with the housing, and, with the module in the operative position, the second position sensor is operative to sense a second portion of the module. The second portion of the module is disposed from the first portion of the module. At least one second indicator is in operatively supported connection with the housing and the at least one second indicator is operative to provide at least one output indicative that the second position sensor senses the module in the operative position.

In a further exemplary embodiment, a third position sensor in operatively supported connection with the housing, and, with the module in the operative position, the third position sensor is operative to sense a third portion of the module. The third portion of the module is disposed from the first portion of the module and disposed from the second portion of the module. At least one third indicator is in operatively supported connection with the housing and is operative to provide at least one output indicative that the third position sensor senses the module in the operative position.

In a further exemplary embodiment, the first position sensor, the second position sensor, and the third position sensor are cooperatively operative to sense the position of the module in Cartesian coordinate space.

In a further exemplary embodiment, the at least one first indicator, the at least one second indicator, and the at least one third indicator are cooperatively operative to indicate the position of the module in Cartesian coordinate space.

In a further exemplary embodiment, a fourth position sensor is in operatively supported connection with the housing, and, with the door in the closed position, the fourth position sensor is operative to sense the door in the closed position. At least one fourth indicator is in operatively supported connection with the housing, and the at least one fourth indicator is operative to provide at least one output indicative that the door is in the closed position.

In a further exemplary embodiment, the first position sensor may include a reed switch, vane sensor, Hall effect sensor, magneto-resistive sensor, variable reluctance sensor, inductive sensor, infrared sensor, opto-electronic sensor or other type sensor.

In a further exemplary embodiment, at least one local processor is operatively connected to the first position sensor and operative to indicate the output of the first position sensor.

In a further exemplary embodiment, at least one remote processor is operatively connected to the at least one local processor and operative to indicate the output of the first position sensor.

In a further exemplary embodiment, the module may include one of a card reader, display, dispenser, check acceptor, bill acceptor, bill recycler and printer.

In a further exemplary embodiment, the first position sensor includes a first element operative to emit a signal and a second element operative to receive the signal.

An exemplary embodiment includes a method comprising extending a module in an opening in a housing of an automated banking machine. The automated banking machine includes a card reader operative to read data from cards including data corresponding to financial accounts. The exemplary machine also includes a display, and a cash dispenser. A service activity is conducted on the module while it is extended in the opening. Subsequent to conducting the service activity, the module is moved toward an operative position in the housing. During at least a portion of moving the module toward an operative position, at least one electronic indicator in operative connection with the housing is observed, which indicator indicates whether the module is in the operative position.

In a further exemplary embodiment, an exemplary method includes moving a door, moveably mounted in operatively supported connection with the housing, toward an open position.

In a further exemplary embodiment, an exemplary method includes moving a door, moveably mounted in operatively supported connection with the housing, toward a closed position, and, during at least a portion of doing so, observing at least one electronic indicator in operative connection with the housing which indicates whether the door is in the closed position.

In a further exemplary embodiment, an exemplary method includes determining, through operation of at least one local processor, that the module is not in the operative position. And, if the module is determined to not be in the operative position, causing at least one message to be sent by the at least one local processor to a remote processor.

In a further exemplary embodiment, an exemplary method includes adjusting the module in the operative position.

In a further exemplary embodiment, an exemplary method includes while observing the at least one electronic indicator, determining, by observing the at least one electronic indicator, the orientation of the module relative to the operative position.

In a further exemplary embodiment, an exemplary method includes while determining, by observing the at least one electronic indicator, the orientation of the module relative to the operative position, determining the orientation of the module relative to the operative position in Cartesian space.

The principles described in exemplary embodiments may be applied to numerous automated banking machine configurations.

DETAILED DESCRIPTION OF EXEMPLARY EMBODIMENTS

Figure 1:
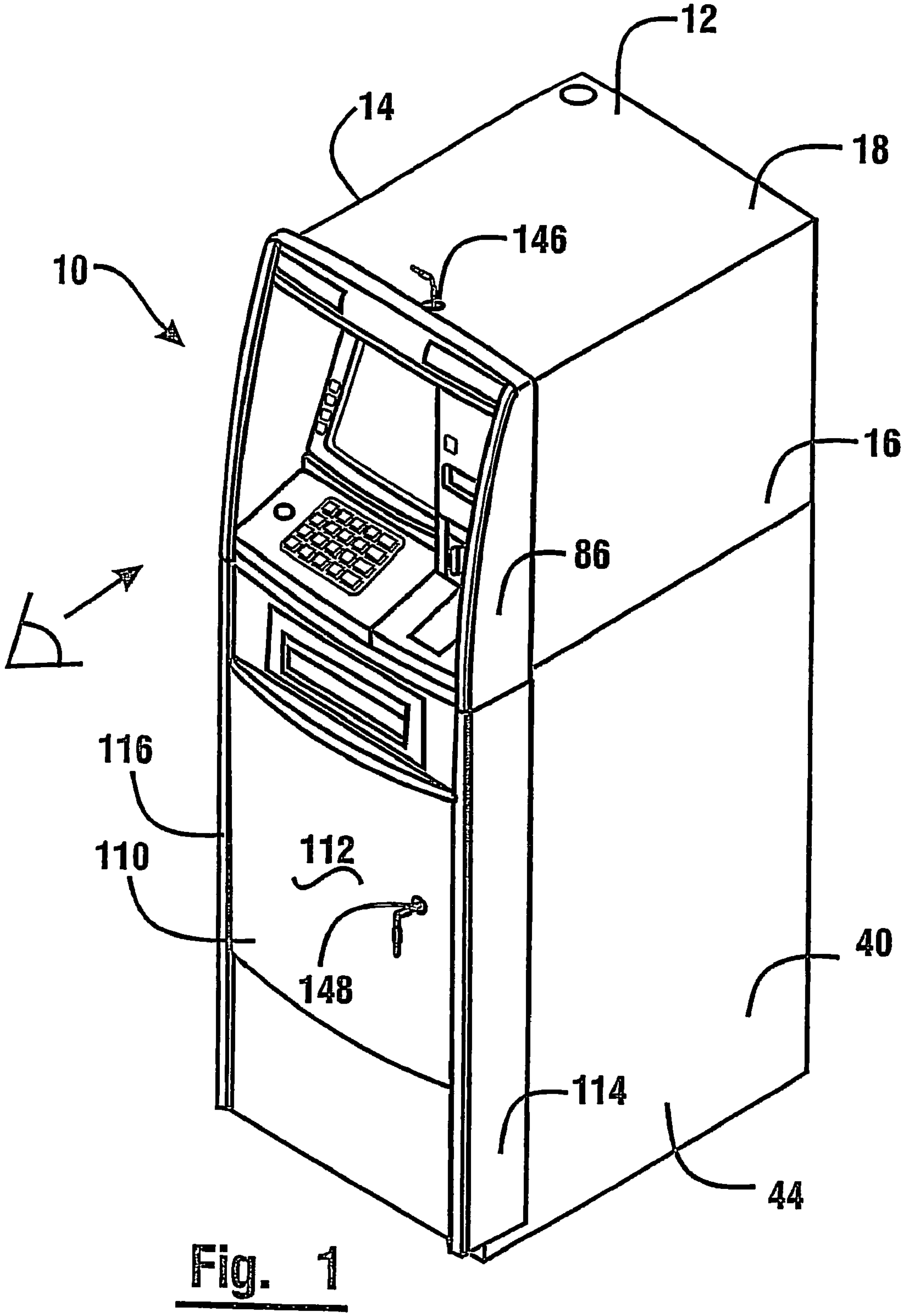
FIG. 1 is an isometric view of an automated banking machine of an exemplary embodiment.
Figure 2:
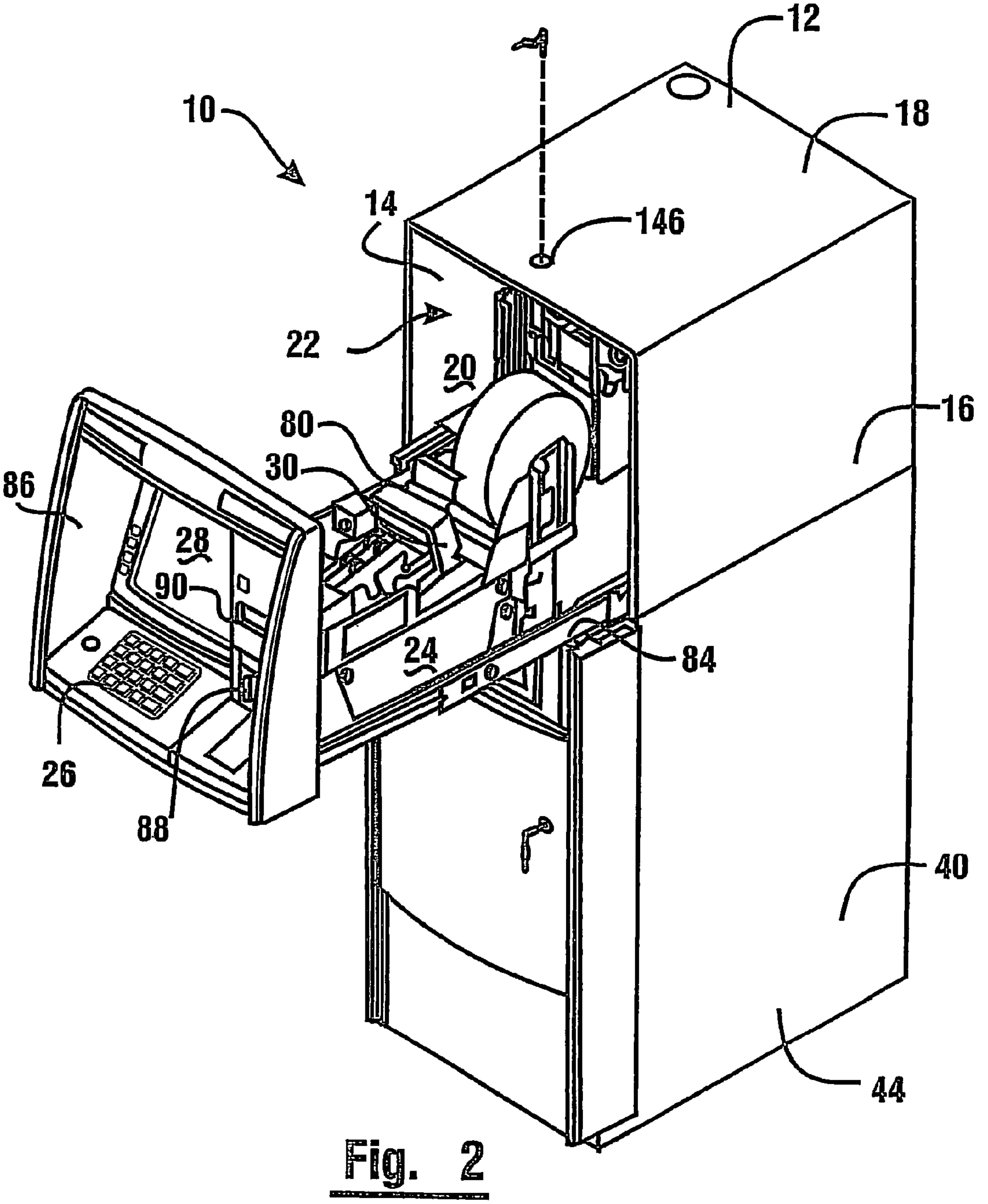
FIG. 2 is an isometric view of the automated banking machine of FIG. 1 with a rollout tray extended.

Referring now to the drawings, and particularly to FIGS. 1-2, there is shown therein an automated banking machine of a first exemplary embodiment, generally indicated 10. In this exemplary embodiment, automated banking machine 10 is an automated teller machine (ATM). ATM 10 includes a top housing 12 having side walls 14 and 16, and top wall 18. Housing 12 encloses an interior area indicated 20. Housing 12 has a front opening 22. In this exemplary embodiment, the rear of housing 12 is closed by a rear wall 19, shown in FIG. 7. However, in other embodiments, the rear of housing 12 may be accessible through an access door or similar device. Top housing 12 is used to house certain banking machine components such as input and output devices.

Figure 3:
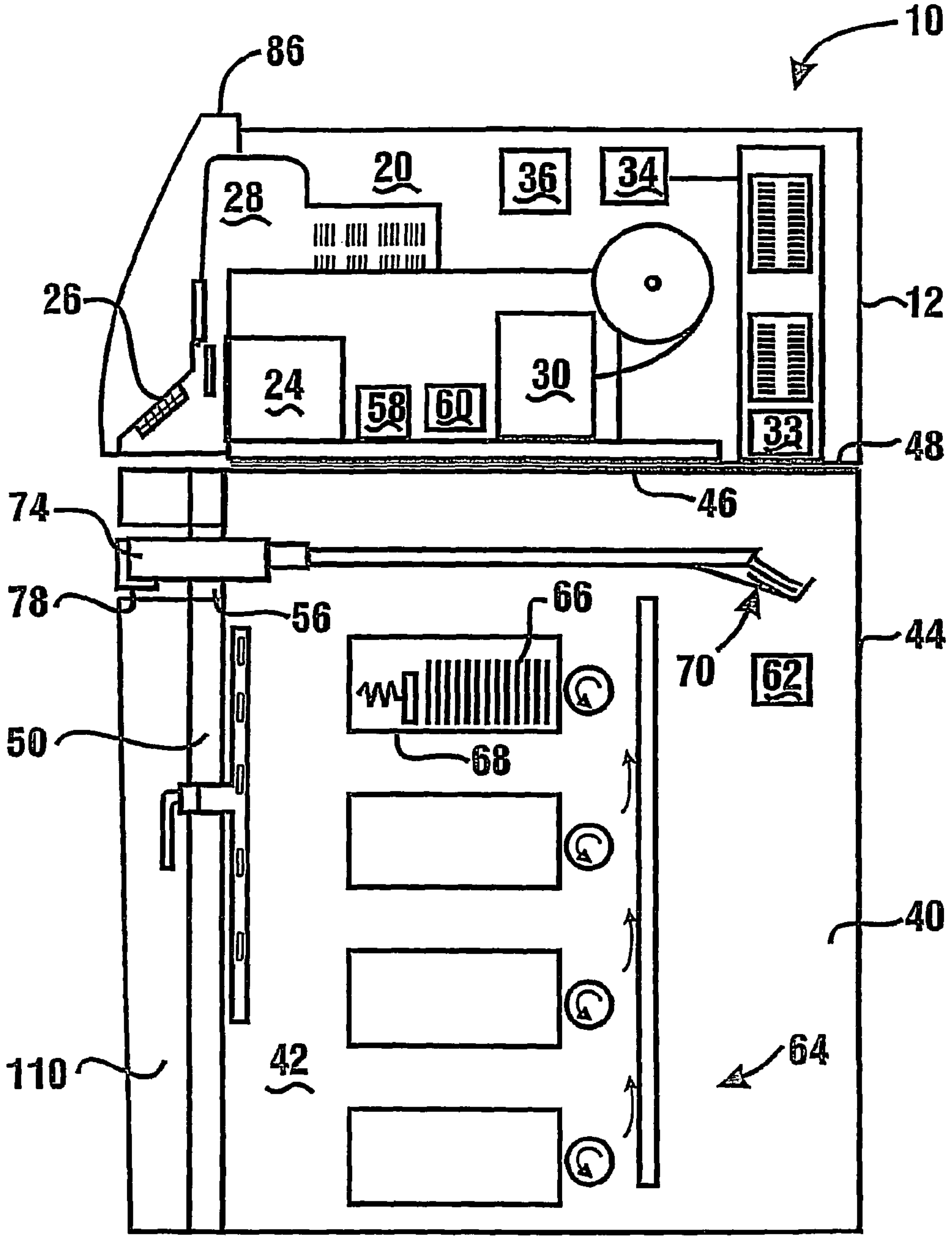
FIG. 3 is a side schematic view of an automated banking machine illustrating various banking machine components.

With reference to FIG. 3, in this exemplary embodiment the input devices include a card reader schematically indicated 24. The card reader is alternatively referred to herein as a module. Card reader 24 is operative to read a customer's card which includes indicia thereon. The indicia may correspond to information about the customer and/or information about a customer's financial account, such as the customer's account number. In some embodiments the card reader 24 may be a card reader adapted for reading magnetic stripe cards and/or so called "smart cards" which include a programmable memory. Other embodiments may read data from cards wirelessly such as RFID cards. Exemplary embodiments may include features of the types discussed in U.S. Pat. Nos. 7,118,031 and/or 7,333,954 the disclosures of which are incorporated herein by reference.

Another input device in the exemplary embodiment includes input keys 26. Input keys 26 may in embodiments, be arranged in a keypad or keyboard. Input keys 26 may alternately or in addition include function keys or other types of devices for receiving manual inputs. It should be understood that in various embodiments other types of input devices may be used such as biometric readers, speech or voice recognition devices, inductance type readers, IR type readers, and other devices capable of communicating with a person, article or computing device, radio frequency type readers and other types of devices which are capable of receiving information that identifies a customer and/or their account.

The exemplary embodiment of machine 10 also includes output devices providing outputs to the customer. In the exemplary embodiment machine 10 includes a display 28. Display 28 may include an LCD, CRT or other type display that is capable of providing visible indicia to a customer. In other embodiments output devices may include devices such as audio speakers, RF transmitters, IR transmitters or other types of devices that are capable of providing outputs which may be perceived by a user either directly or through use of a computing device, article or machine. It should be understood that embodiments may also include combined input and output devices such as a touch screen display which is capable of providing outputs to a user as well as receiving inputs.

The exemplary embodiment of the automated banking machine 10 also includes a receipt printer schematically indicated 30. The receipt printer is alternatively referred to herein as a module. The receipt printer is operative to print receipts for users reflecting transactions conducted at the machine. Embodiments may also include other types of printing mechanisms and modules such as statement printer mechanisms, ticket printing mechanisms, check printing mechanisms and other devices that operate to apply indicia to media in the course of performing transactions carried out with the machine.

Automated banking machine 10 further includes one or more processors schematically indicated 33. Processor 33, alternately referred to as a computer or a controller, is in operative connection with at least one memory or data store which is schematically indicated 34. The processor 33 is operative to carry out programmed instructions to achieve operation of the machine in accomplishing transactions. The processor 33 is in operative connection with a plurality of the transaction function devices included in the machine.

The exemplary embodiment includes at least one communications device 36. The communications device 36 may be one or more of a plurality of types of devices that enable the machine to communicate with other systems and devices for purposes of carrying out transactions. For example, communications device 36 may include a modem for communicating messages over a data line or wireless network, with one or more other computers that operate to transfer data representative of the transfer of funds in response to transactions conducted at the machine. Alternately the communications device 36 may include various types of network interfaces, line drivers or other devices suitable to enable communication between the machine 10 and other computers and systems. Exemplary embodiments may include features like those disclosed in U.S. Pat. No. 7,266,526 the disclosure of which is incorporated herein by reference.

ATM 10 further includes a safe or chest 40 enclosing a secure area 42. Secure area 42 is used in the exemplary embodiment to house critical components and valuable documents. Specifically in the exemplary embodiment secure area 42 is used for housing currency, currency dispensers, currency stackers, and other banking machine components. For purposes of this disclosure a cash dispenser shall include any mechanism that makes currency stored within the machine accessible from outside the machine. Cash dispensers may include features of the type disclosed in U.S. Pat. Nos. 7,261,236; 7,240,829; 7,114,006; 7,140,607 and 6,945,526 the disclosures of which are incorporated herein by reference.

Chest 40 includes a chest housing 44 including a top wall 46 having an upper surface 48 outside of the secure area 42. Top housing 12 is supported on the chest 40 such that the secure area 42 is generally below the interior area 20.

Chest 40 also includes a chest door 50 that is moveably mounted in supporting connection with the housing. Chest door 50, shown in the closed position in FIG. 4 and in an open condition in FIG. 5, is generally closed to secure the contents of the chest 40. In this exemplary embodiment, the chest door 50 is used to close a first opening 52 at a first end 54 of the chest housing 44. In other embodiments the chest opening and door may have other configurations. In the exemplary embodiment, chest door 50 includes a first device opening 56 therethrough and cooperates with mechanisms inside and outside the chest for passing currency or other items between a customer and devices located inside the chest 40.

Referring again to FIG. 3, machine 10 also includes a plurality of sensing devices for sensing various conditions in the machine. These various sensing devices are represented schematically by component 58 for simplicity and to facilitate understanding. It should be understood that a plurality of sensing devices is provided in the machine for sensing and indicating to the processor 33 the status of devices within the machine.

Exemplary automated banking machine 10 further includes a plurality of actuators schematically indicated 60 and 62. The actuators may comprise a plurality of devices such as motors, solenoids, cylinders, rotary actuators and other types of devices that are operated responsive to the processor 33. It should be understood that numerous components within the automated banking machine are operated by actuators positioned in operative connection therewith. Actuators 60 and 62 are shown to schematically represent such actuators in the machine and to facilitate understanding.

Machine 10 further comprises at least one currency dispenser mechanism 64 which is alternatively referred to as a module, which during operation is housed in secure area 42. The currency dispensing mechanism 64 is operative responsive to the processor 33 to pick currency sheets from a stack of sheets 66 housed in one or more canisters 68. The picked currency sheets may be arranged by a currency stacker mechanism 70 for presentation through a delivery mechanism 74 which operates to present a stack of note or other documents to a customer.

When chest door 50 is in the closed position, at least an end portion of a sheet delivery mechanism 74 extends through first opening 56 in the chest door 50. In response to operation of the processor 33, when a desired number of currency sheets have been collected in a stack, the stack is moved through delivery mechanism 74.

As the sheets are moved through delivery mechanism 74 toward the first opening 56, the controller 32 operates a suitable actuating device to operate a gate 78 so as to enable the stack of sheets to pass outward through the opening. As a result the user is enabled to receive the sheets from the machine. After a user is sensed as having removed the stack from the opening, the controller may operate to close the gate 78 so as to minimize the risk of tampering with the machine.

Other exemplary embodiments may include other devices which may alternatively be referred to herein as module. Such devices may include currency recyclers and/or check acceptors. Such devices may include features like those shown in U.S. Pat. Nos. 7,461,777; 7,448,535; and 7,448,536 the disclosures of which are incorporated herein by reference in their entirety.

With reference to FIG. 2, in this exemplary embodiment, ATM 10 further includes a rollout tray 80. Rollout tray 80 is moveably mounted in supporting connection with slides 84. The slides 84 enable movement of the rollout tray 80 between the extended position shown in FIG. 2 and a retracted position within the interior area 20 of the top housing 12. Rollout tray 80 in the exemplary embodiment may be similar to that shown in U.S. Pat. No. 6,082,616, the disclosure of which is incorporated by reference as if fully rewritten herein.

Rollout tray 80 may have several upper banking machine components supported thereon including card reader 24, input keys 26, display 28, receipt printer 30, and other components as appropriate for the particular ATM 10.

This exemplary embodiment further includes an upper fascia 86 in supporting connection with rollout tray 80. The upper fascia 86 may include user interface openings such as a card opening 88 through which a customer operating the machine 10 may insert a credit, debit or other card, or a receipt delivery slot 90 through which printed transactions receipts may be delivered to the customer. Rollout tray 80 moveably supports upper fascia 86 relative to the top housing 12 so that upper fascia 86 is movable between a first position covering the front opening and a second position in which the upper fascia is disposed from the front opening 22.

As illustrated in FIG. 1, in the operative condition of ATM 10, the rollout tray 80 is retracted into the interior area 20 of the housing 12. Upper fascia 86 operates to close front opening 22 and provide an attractive appearance for ATM 10, while allowing a customer to input information and receive outputs from ATM 10.

Figure 6:
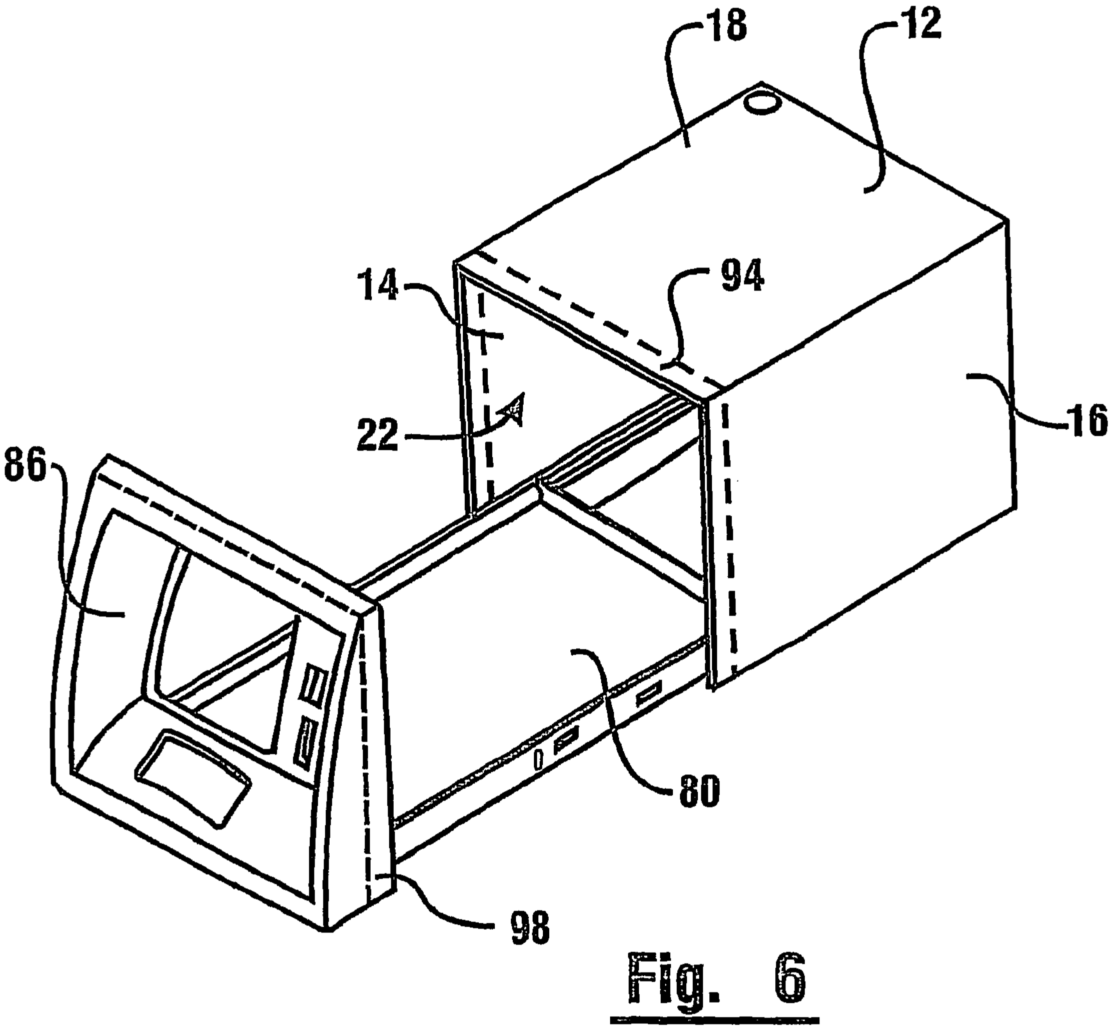
FIG. 6 is an isometric view of a top housing for an automated banking machine supporting a rollout tray in an extended position.

With reference to FIG. 6, in this exemplary embodiment, the forward-most parts of side walls 14 and 16 and top wall 18 of housing 12 define a forward region 94, shown in dashed lines, bounding the front opening 22. In this exemplary embodiment, upper fascia 86 includes a rearwardly extending portion 98, also shown in dashed lines. Rearwardly extending portion 98 is dimensioned to overlie in generally surrounding relation, the forward region 94 when rollout tray 80 is retracted and upper fascia 86 is in the first position. In some embodiments the rearwardly extending portion may be contoured or tapered so as to extend further inwardly with increasing proximity to the front of the fascia. Such tapered control may engage and help to close and/or align the fascia and the top housing 12.

Figure 7:
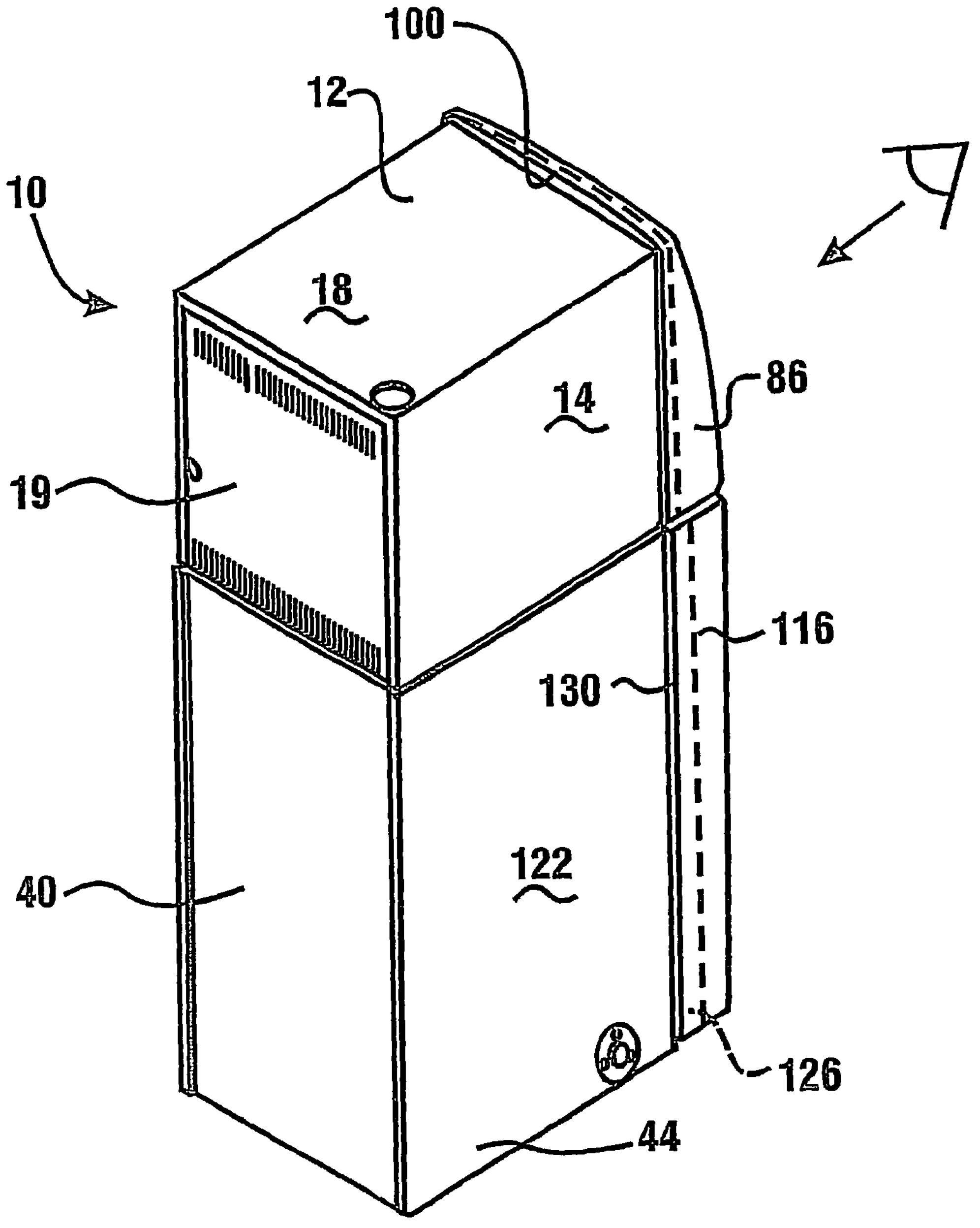
FIG. 7 is an isometric rear view of the automated banking machine of FIG. 1.

With reference to FIG. 7, when ATM 10 is viewed from the rear, there may be a first gap 100 separating the rearwardly extending portion 98 of upper fascia 86 from the top housing 12. In some embodiments it may be desirable that first gap 100 be minimal to prevent unauthorized access to interior area 20. First gap 100 in the exemplary embodiment is not visible when ATM 10 is viewed from the front.

In this exemplary embodiment, the upper fascia 86 is formed of a plastic material and the top housing 12 is formed of sheet metal. Alternately, the extending portion 98 or forward portion 94 shown in FIG. 6, or both, may include resilient materials to provide for engagement and sealing of the housing and the fascia in the closed position. However, other materials may be chosen, and these approaches are exemplary.

Figure 4:
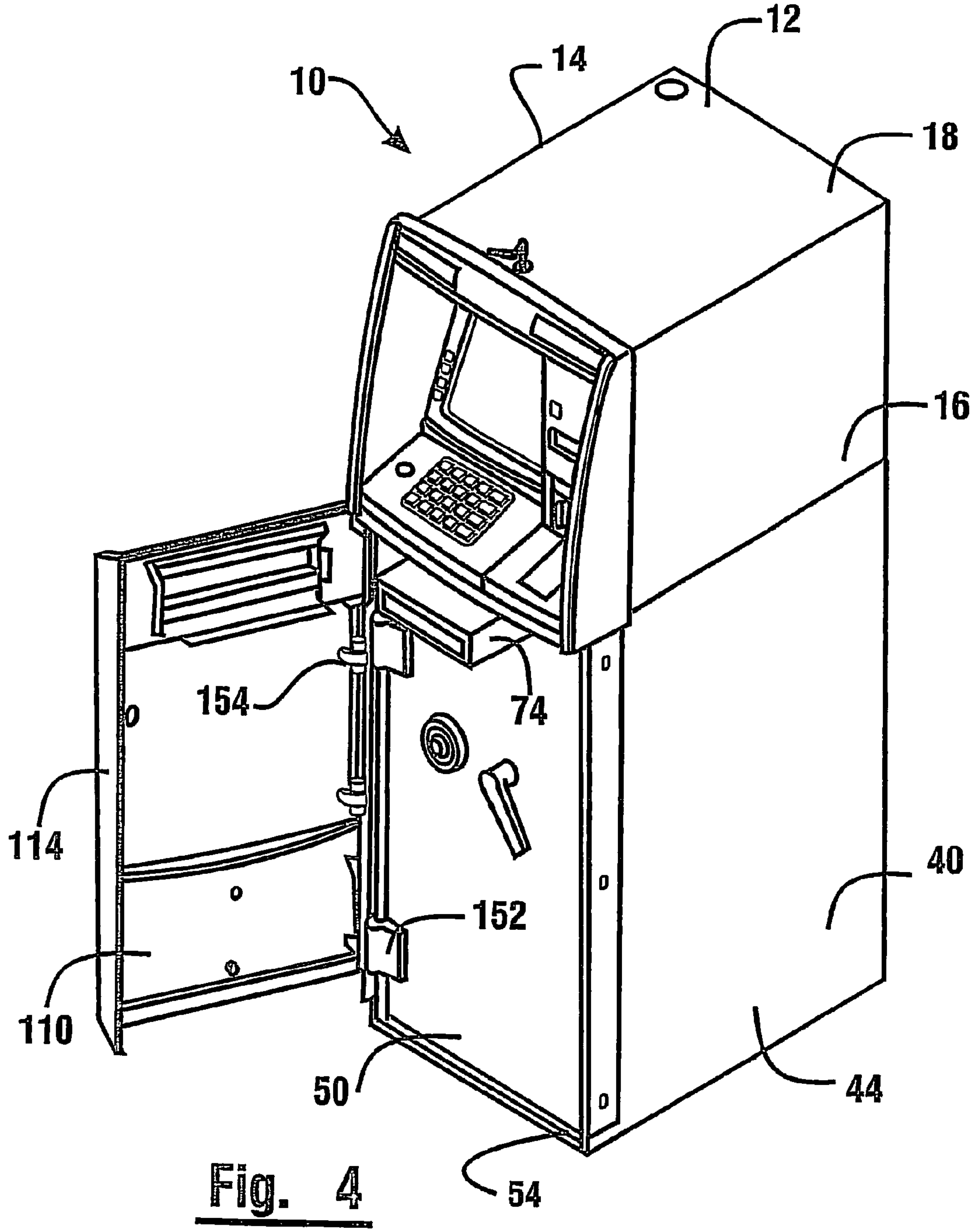
FIG. 4 is an isometric view of the automated banking machine of FIG. 1 with a lower fascia in an accessible position.
Figure 5:
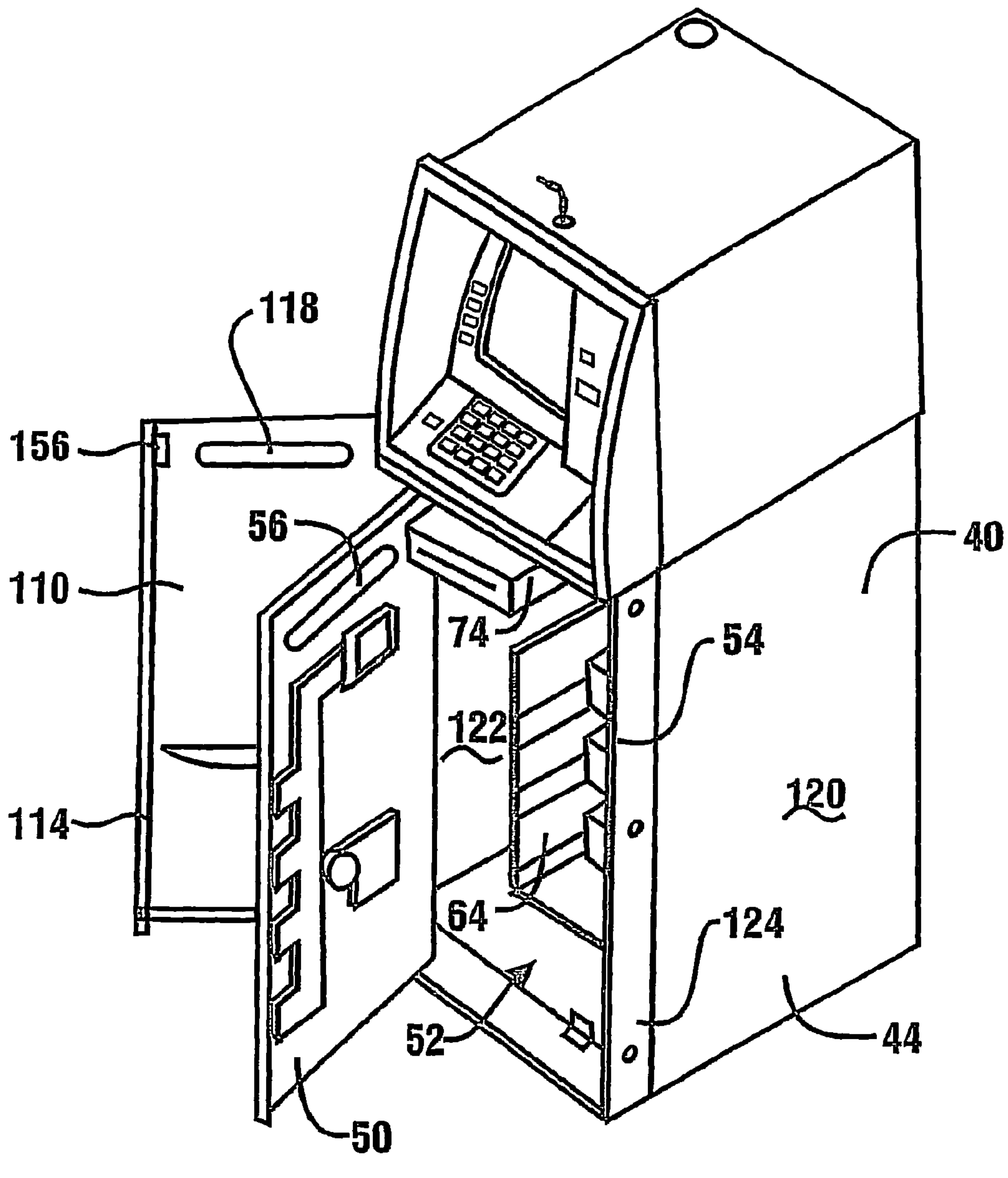
FIG. 5 is an isometric view of the automated banking machine of FIG. 1 with a lower fascia in an accessible position and a chest door in an open position.

With reference to FIGS. 1, 4 and 5, the exemplary embodiment further includes a lower fascia 110 moveably mounted on the chest housing 44. In this exemplary embodiment, lower fascia 110 is operable to move between a covering position as illustrated in FIG. 1, and an accessible position as illustrated in FIGS. 4-5. In other applications, it may be preferable to provide a selectively removable lower fascia, or other approaches to supporting the lower fascia on the chest portion.

The exemplary lower fascia 110 operates to cover the chest 40 to thereby provide a more attractive appearance to ATM 10. In the exemplary embodiment, lower fascia 110 includes a front face 112 and first and second side extensions 114, 116, respectively.

In the exemplary embodiment, illustrated in FIGS. 5 and 7, chest housing 44 includes first and second side walls 120, 122, respectively. First side wall 120 includes a forward portion 124 and second side wall includes a forward portion 126 (shown in phantom in FIG. 7). When the chest door 50 is in the closed position and the lower fascia 110 is in the covering position, the first and second side extensions 114, 116, respectively, overlie forward portions 124, 126.

Thus, when ATM 10 is viewed from the front (see FIG. 1), the lower fascia 110 covers the chest 40 from side to side. When ATM 10 is viewed from the rear (see FIG. 7), a lower gap (not shown) between the first side extension 114 and the first side wall 120 of the chest housing 44 and a lower gap 130 between the second side extension and 116 the second side wall 122 may be visible, although such lower gaps are not viewable from the front of ATM 10. In some applications, it may be desirable to minimize the lower gaps 130.

Figure 8:
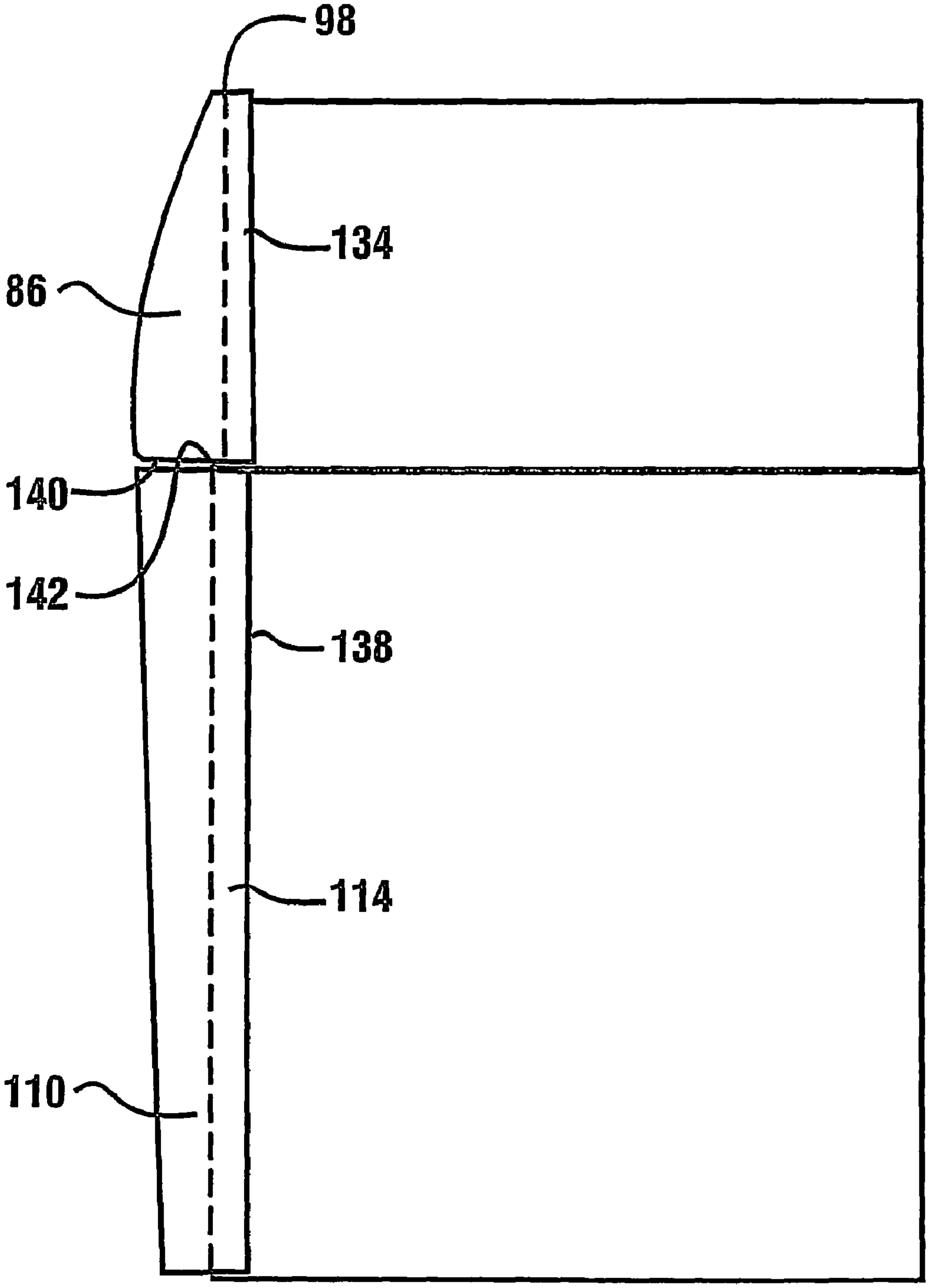
FIG. 8 is a side schematic view of an exemplary embodiment of an automated banking machine illustrating the alignment of an upper fascia and a lower fascia.

As best illustrated in FIG. 8, in the exemplary embodiment, the rearwardly extending portion 98 of upper fascia 86 includes a rearward facing end edge 134. Also, in the exemplary embodiment, first side extension 114 of lower fascia 110 includes rearward facing end edge 138. When viewed from the first side of ATM 10, in the exemplary embodiment, end edge 134 of upper fascia 86 and end edge 138 of lower fascia 110 are substantially vertically aligned along a first side of ATM 10 when the upper fascia 86 is in the first position and the lower fascia 110 is in the covering position.

With continued reference to FIG. 8, in the exemplary embodiment, upper fascia 86 is bounded by a lower surface 140. Lower fascia 110 is bounded by an upper surface 142. In the exemplary embodiment, lower surface 140 is adapted for substantial parallel horizontal alignment with upper surface 142 when the upper fascia 86 is in the first position and the lower fascia 110 is in the covering position. The alignment of the fascia surfaces presents an attractive appearance to ATM 10.

In this exemplary embodiment, the rearwardly extending portion 98 further operates to simplify the manufacture and assembly of the ATM 10. In some previous machines, it was necessary to more precisely control the alignment of the walls of the upper fascia 86 with the perimeter of the front opening. However, in this disclosed exemplary embodiment, because the rearwardly extending portion 98 overlies the forward region 94, the required precision is lessened. Further, in those embodiments which include a tapered engagement, alignment of the top housing 12 and upper fascia 86 is facilitated.

With particular reference to FIG. 5, lower fascia 110 may include an access opening 118 therein. In this exemplary embodiment, access opening 118 in the lower fascia 110 is adapted to be substantially aligned with first device opening 56 in chest door 50 when chest door is closed and lower fascia 110 is in the covering position. In this exemplary embodiment, when the chest door 50 is closed and lower fascia 110 is in the covering position, at least an end portion of sheet delivery mechanism 74 extends in the first device opening 56 in chest door 50 and access opening 118 in lower fascia 110.

As illustrated in FIGS. 1 and 2, in this exemplary embodiment, ATM 10 includes a first locking mechanism 146 for selectively retaining the rollout tray 80 in the retracted position when upper fascia 86 covers the front opening 22. The first locking mechanism may be of the type described in U.S. Pat. No. 6,082,616 previously incorporated herein.

In the exemplary embodiment, ATM 10 also includes a second locking mechanism 148 for selectively securing lower fascia 110 in the covering position.

Figure 9:
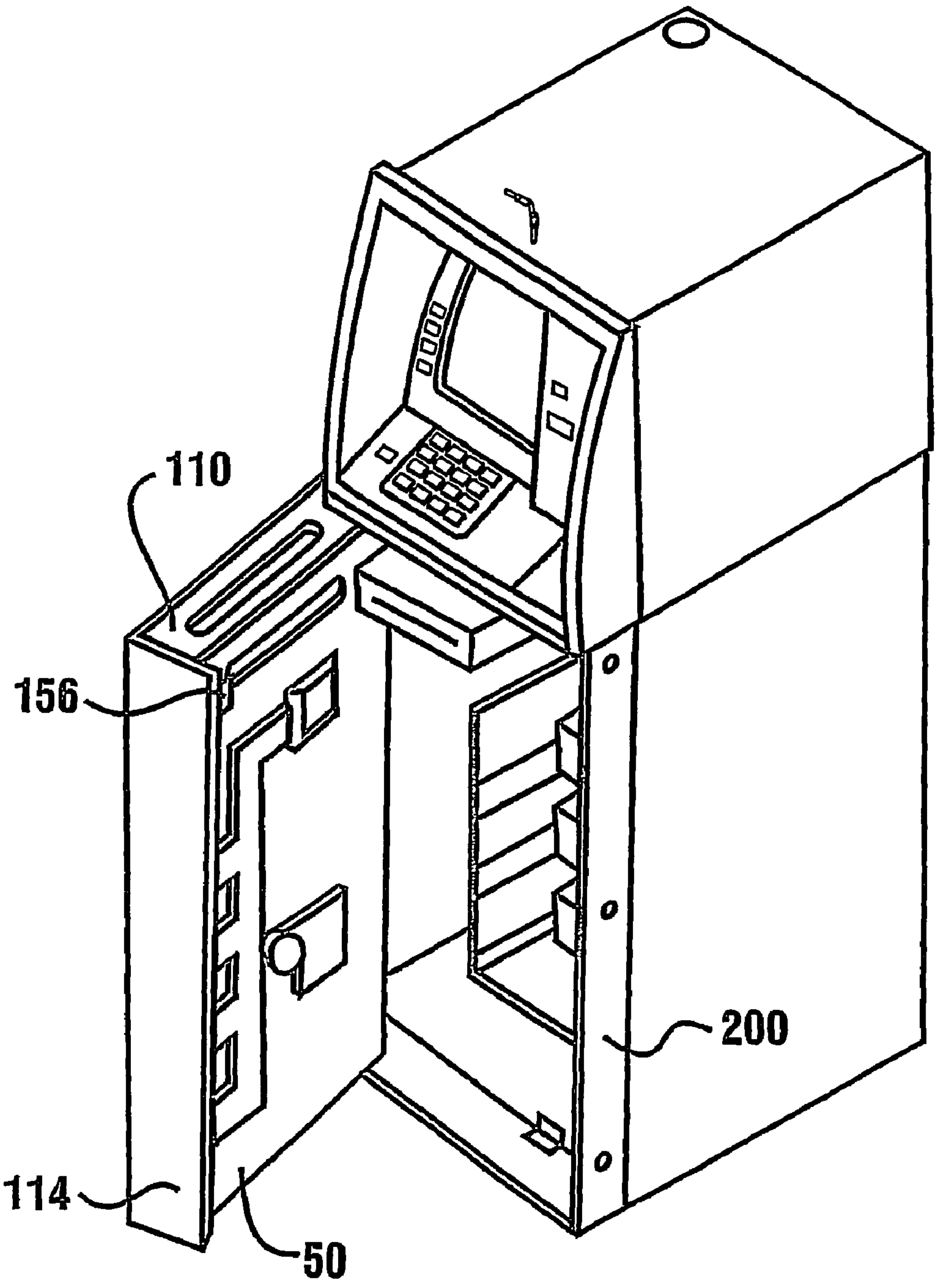
FIG. 9 is an isometric view of an automated banking machine similar to FIG. 5 showing the chest door selectively engaged with the lower fascia.

With particular reference to FIGS. 4, 5 and 9, in another exemplary embodiment ATM 10 may include a top housing 12 as previously described. ATM 10 further includes chest 40 having chest door 50 mounted to the housing 44 by one or more chest door hinge assemblies 152. Lower fascia 110 is moveably mounted to chest housing 44 by one or more fascia hinges 154. In this exemplary embodiment, fascia hinge 154 and chest door hinge assembly 152 are situated on the same side of the chest housing 44 so that lower fascia 110 and chest door 50 pivot generally in the same direction relative to the chest.

From time to time, the banking machine components enclosed within secure enclosure 42 must be accessed for replenishment or other servicing activity. Thus, lower fascia 110 may be selectively moved from a covering position into an accessible position to allow access to chest door 50. Chest door 50 may then be selectively opened.

In this exemplary embodiment, as best seen in FIG. 9, lower fascia 110 is operable to engage the open chest door 50 to prevent its movement back to a closed position. In this exemplary embodiment, lower fascia 110 includes an inwardly directed flange 156 carried on an inner surface at a side opposite the fascia hinge 154. Inwardly directed flange 156 is dimensioned to engage at least a portion of chest door 50 when the lower fascia 110 is in the accessible position and the chest door 50 is in the open position. In the exemplary embodiment, lower fascia 110 is adapted to pivot away from the chest door 50 to at least an extent where the chest door may be disengaged from inwardly directed flange 156. Exemplary embodiments may include features of the type discussed in U.S. Pat. Nos. 7,159,767; 7,152,784; 7,000,830; and 6,871,602 the disclosures of which are incorporated herein by reference.

An exemplary embodiment includes a method for accessing the contents of the secure area for servicing components housed therein or to replenish currency sheets. The method includes placing the lower fascia into an accessible position from a covering position to uncover the chest door; opening the chest door to provide access to the secure area through an opening in the chest housing; and engaging the chest door and the lower fascia to hold the chest door in an open condition. Thus a currency dispenser mechanism or other components may be accessed.

Servicing the currency dispenser may include adding or removing currency sheets from operative engagement with the currency dispenser mechanism.

The method may further include engaging the chest door with an inwardly directed flange that is mounted in supporting connection with the lower fascia.

To return the ATM to an operational condition, the method includes moving the lower fascia outwardly relative to the engaged chest door to disengage the chest door; closing the chest door; and repositioning the lower fascia into the covering position.

Repositioning the lower fascia into the covering position includes overlying a first forward portion of the chest housing with a first side extension of the lower fascia and overlying a second forward portion of the chest housing with a second side extension of the lower fascia.

Prior to placing the lower fascia into the accessible position, the method includes unlocking a first locking mechanism operable to selectively retain the lower fascia in a covering position.

Figure 10:
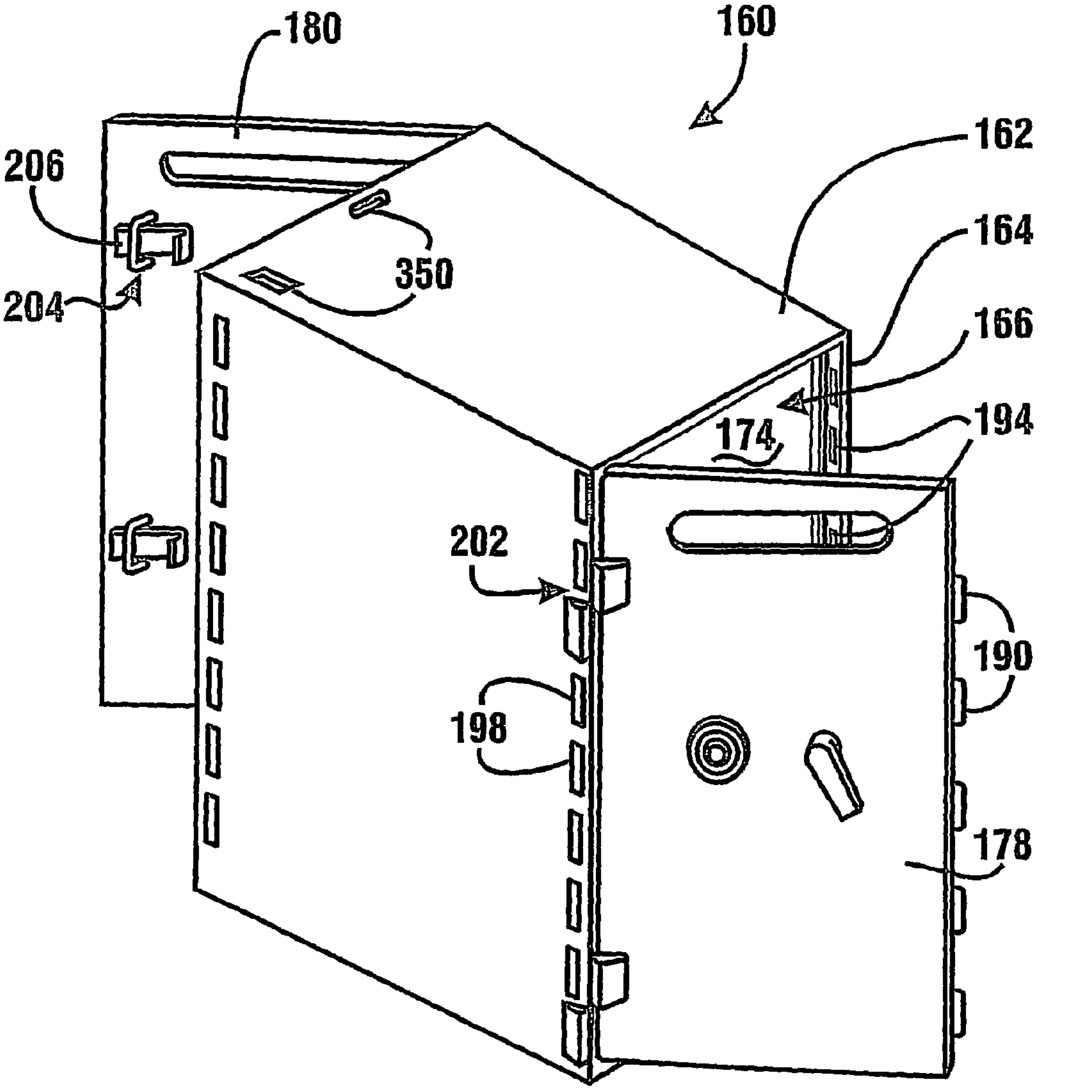
FIG. 10 is a schematic view of an alternate embodiment of a chest for an automated banking machine, as viewed from the front.
Figure 11:
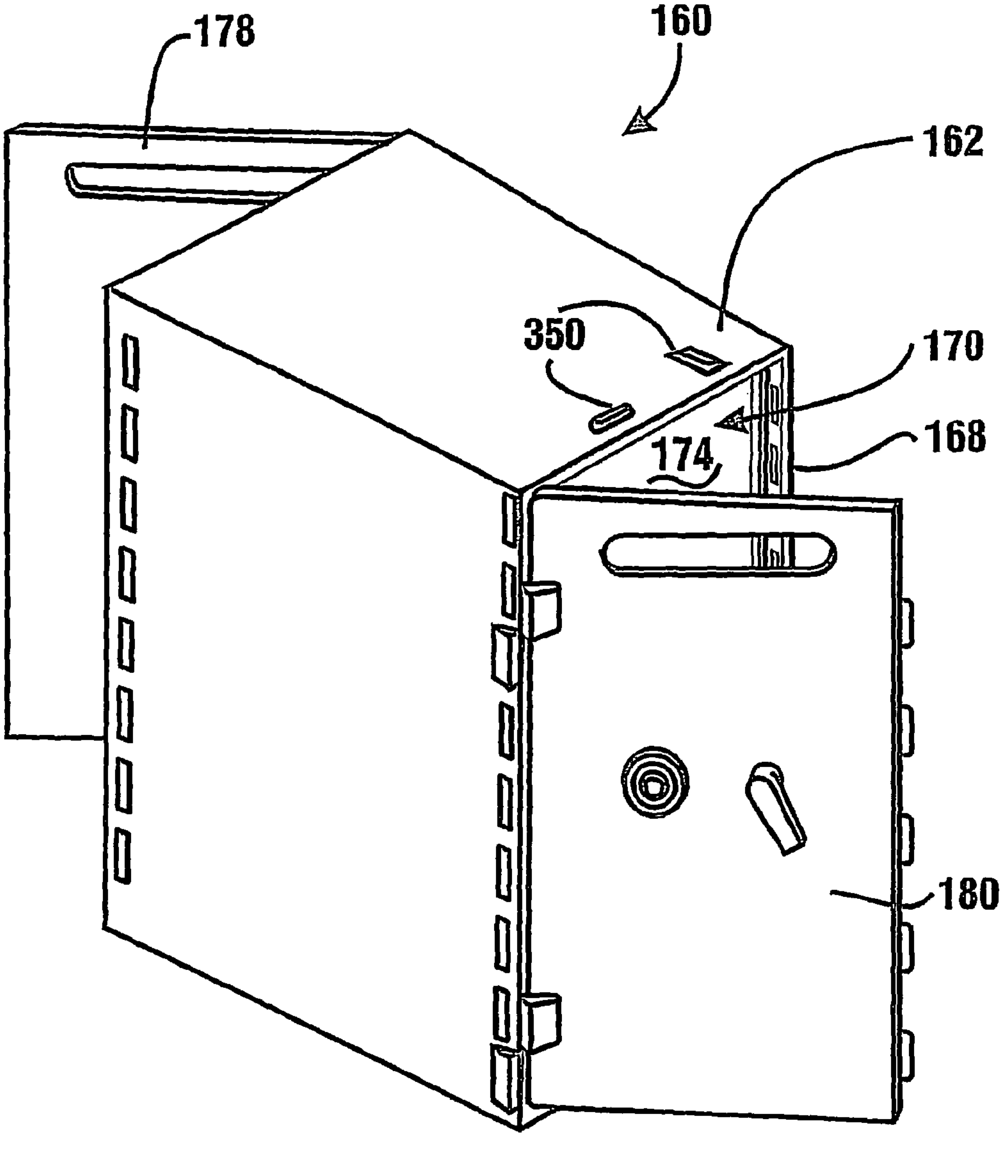
FIG. 11 is a schematic view of the alternate embodiment of the chest shown in FIG. 10, as viewed from the rear.

Some ATMs may be equipped with another exemplary embodiment of a chest or safe 160, as best seen in FIGS. 10-11. Chest 160 includes a chest housing 162 having first end 164 defining a first opening 166 therein and second end 168 defining a second opening 170 therein. The chest of this exemplary embodiment is particularly adapted for applications wherein a common chest housing can be utilized in either "front-load" ATMs or "rear-load" ATMs. By "front-load" ATM it is meant that access to a secure area 174 in an operable machine may be selectively attained from the front of the ATM, which is the same side that customers use to provide input to the machine. By "rear-load" ATM it is meant that access to the secure area 174 in an operable machine may be selectively attained from the rear of the ATM, while customer inputs are provided at the front of the ATM.

In this exemplary embodiment, chest 160 includes a first chest door 178 moveably mounted adjacent a first end 164 of chest housing 162 to selectively close the first opening 166. Chest 160 further includes a second chest door 180 moveably mounted adjacent the second end 168 to selectively close the second opening 170.

In the exemplary embodiment illustrated in FIG. 10, chest 160 is adapted for use in a front load ATM wherein under usual operating conditions, first chest door 178 is selectively movable to open or close first opening 166 to allow access to secure area 174. In this exemplary embodiment, second chest door 180 is adapted to remain closed during usual operation of the ATM, including those times when access to secure area 174 is desired. For purposes of this disclosure, the term "semi-permanently" closed is used to describe a condition of a chest door that closes an opening in the chest housing in a manner that does not readily permit access to the secure area. In this way, a "semi-permanently" closed chest door is not used as the primary means for accessing the chest interior. However, under appropriate conditions the semi-permanently closed chest door can be opened.

In this exemplary embodiment, first chest door 178 is the operable door and second chest door 180 is adapted to be semi-permanently closed. In other embodiments, for instance in rear-load ATMs, it may be desirable to utilize chest 160 as illustrated in FIG. 11 where the second chest door 180 is the operable door while first chest door 178 is adapted to be semi-permanently closed.

Figure 12:
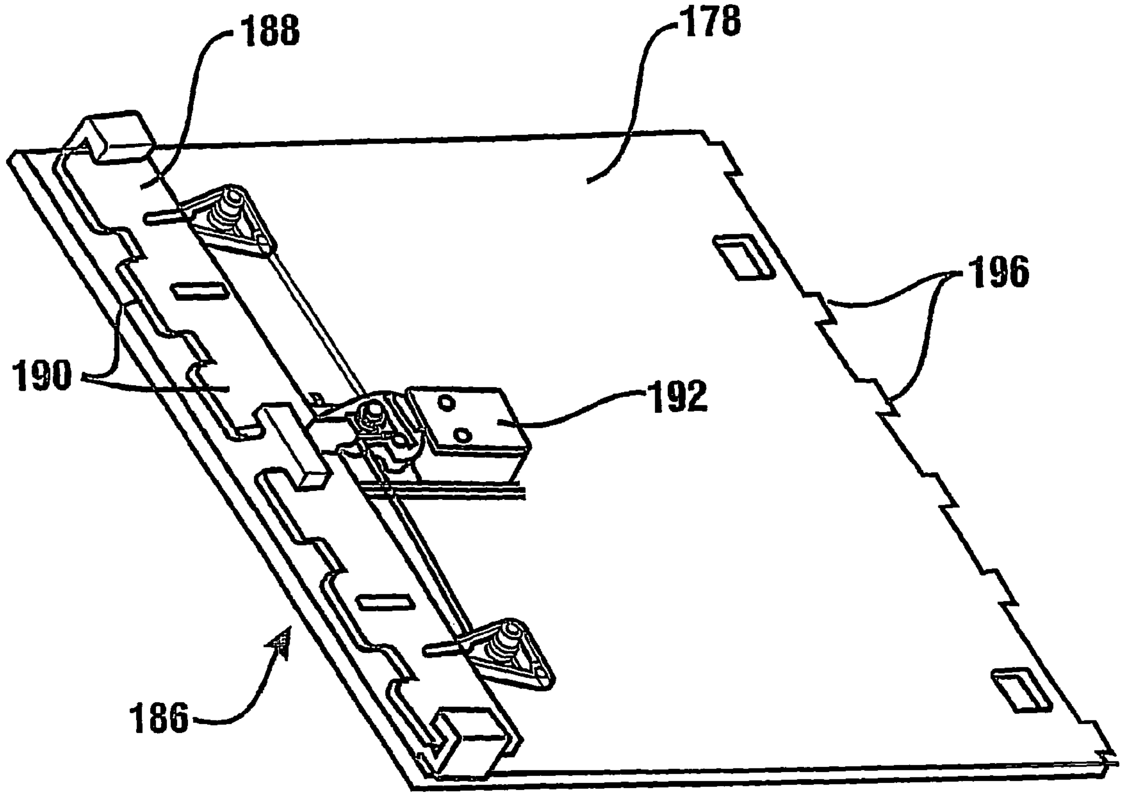
FIG. 12 is an isometric view of a chest door illustrating a locking bolt mechanism.

With particular reference to FIGS. 10 and 12, in the exemplary embodiment, the first chest door 178 is equipped with a suitable locking bolt mechanism generally denoted 186. Locking bolt mechanism 186 is operative to selectively enable securing first chest door 178 in a locked condition. Locking bolt mechanism 186 may be of the type described in U.S. Pat. No. 6,089,168 which is incorporated by reference as if fully rewritten herein. Of course, other suitable bolt works can be utilized to accomplish the objectives.

Locking bolt mechanism 186 of the exemplary embodiment includes a locking bolt 188 which includes a plurality of locking bolt projections 190. Locking bolt 188 is mounted in operatively separated connection with an interior surface of first chest door 178 so as to be slideably movable between an extended position and a retracted position.

First chest door 178 also has a lock 192 mounted thereto. Lock 192 cooperates with locking bolt mechanism 186 so that first chest door 178 is enabled to be changed from a locked condition to an unlocked condition. As shown in FIG. 10, the chest housing 162 includes a plurality of vertically spaced locking bolt apertures 194 which are sized and positioned for accepting the locking bolt projections 190.

It will be appreciated by those skilled in the art that the locking bolt mechanism because it provides multiple places for engagement with the chest housing, achieves more secure locking of the door in the closed position than a locking bolt mechanism providing a single place for engagement with the chest housing.

In the exemplary embodiment, first chest door 178 includes a plurality of dead bolt projections 196 extending on a hinge side of the door. These dead bolt projections 196 are preferably positioned and sized to be accepted in the dead bolt apertures 198 in housing 162. As will be appreciated, the acceptance of the dead bolt projections 196 into the dead bolt apertures 198 provides enhanced security. In an exemplary embodiment, the dead bolt apertures and the locking bolt apertures are covered by trim pieces 200 (shown in FIG. 9) that extend on the outside of the housing.

With reference to FIG. 10, in the exemplary embodiment, the first chest door 178 is operably connected to the chest housing via one or more first chest hinge assemblies 202. The exemplary chest hinge assembly 202 may be of the type described in U.S. Pat. Nos. 6,089,168 and/or 7,156,297 previously incorporated. It will be readily understood that other hinge constructions may be used in other embodiments.

In the exemplary embodiment, the second chest door 180 may be secured in a closed position by a securing mechanism that generally mirrors the locking bolt mechanism 186 and lock 192. Alternately, as illustrated in FIG. 10, second chest door 180 may be "semi-permanently" secured by an alternate securing mechanism 204. The alternate securing mechanism 204 may include a bolt member 206 or other mechanism that is less complex than the locking bolt mechanism and lock previously described. In this exemplary embodiment, routine access to the secure area 174 via second chest door 180 is not necessary during normal operation of the ATM. Thus, the alternate securing mechanism 204 is operable to "semi-permanently" engage the chest door 180. This may be done, for example, by securing the bolt with fasteners or other devices that are only accessible from within the interior of the chest portion. Of course, in some alternative embodiments both chest doors may be equipped with operational locking bolt mechanisms and locks.

The manufacture of an exemplary ATM may be simplified by use of chest 160. A common chest housing may be utilized in applications requiring a front-load ATM or a rear-load ATM. After the housing has been assembled, the positioning of a locking bolt mechanism may be chosen according to the configuration of the chest. Additionally, at a subsequent time, the operational features may be changed so that the initial operational chest door becomes the non-operational door and vice versa. Thus, the manufacturing process is simplified by the versatility of the chest housing.

Of course it will be readily appreciated that ATMs incorporating this exemplary embodiment of chest 160 may include any of the other features described elsewhere.

An exemplary embodiment includes a method for utilizing an ATM that is equipped with a chest having two opposed openings. The chest housing includes a first opening at a first end thereof and a second opening at a second opposed end. The first door is moveably mounted in supporting connection with the chest housing so that the first chest door is operative to selectively close the first opening. A second chest door is moveably mounted in supporting connection with the chest housing so that the second door is operative to semi-permanently close the second opening. At least one lower banking machine component is mounted in supporting connection with the chest housing in the secure area.

In the exemplary method, a first locking bolt mechanism in supporting connection with the first chest door is operated to selectively securely engage the first chest door with the chest housing. A first securing mechanism in supporting connection with the second chest door is operated to semi-permanently securely engage the second chest door with the chest housing.

The method includes accessing at least one lower banking machine component of an ATM through a first opening in a chest housing bounding a secure area; and preventing access to the at least one lower banking machine component through the second opening.

The method further includes replacing the first locking bolt mechanism with a second securing mechanism in supporting connection with the first chest door, wherein the second securing mechanism is operative to semi-permanently securely engage the first chest door with the chest housing; and replacing the first securing mechanism with a second locking bolt mechanism in supporting connection with the second chest door, wherein the second locking bolt mechanism is operative to selectively securely engage the second chest door with the chest housing. Thus, the door chosen as the operative door can be selected and changed.

The exemplary ATM may include a lower fascia that is mounted in supporting connection with the chest housing, wherein the lower fascia is selectively movable between a covering position and an accessible position. The exemplary method may include moving the lower fascia from the covering position to the accessible position prior to accessing the lower banking machine component. Further, the method may include engaging the first chest door with the lower fascia to hold the first door in the open condition.

The at least one lower banking machine component may comprise a currency dispenser mechanism or module. The exemplary method includes servicing the currency dispenser mechanism after the at least one lower banking machine component is accessed. This may include for example features included in U.S. Pat. Nos. 7,195,237 and/or 7,111,776 the disclosures of which are incorporated herein by reference.

The at least one lower banking machine component may comprise a currency stacker. The exemplary method includes servicing the currency stacker.

Figure 13:
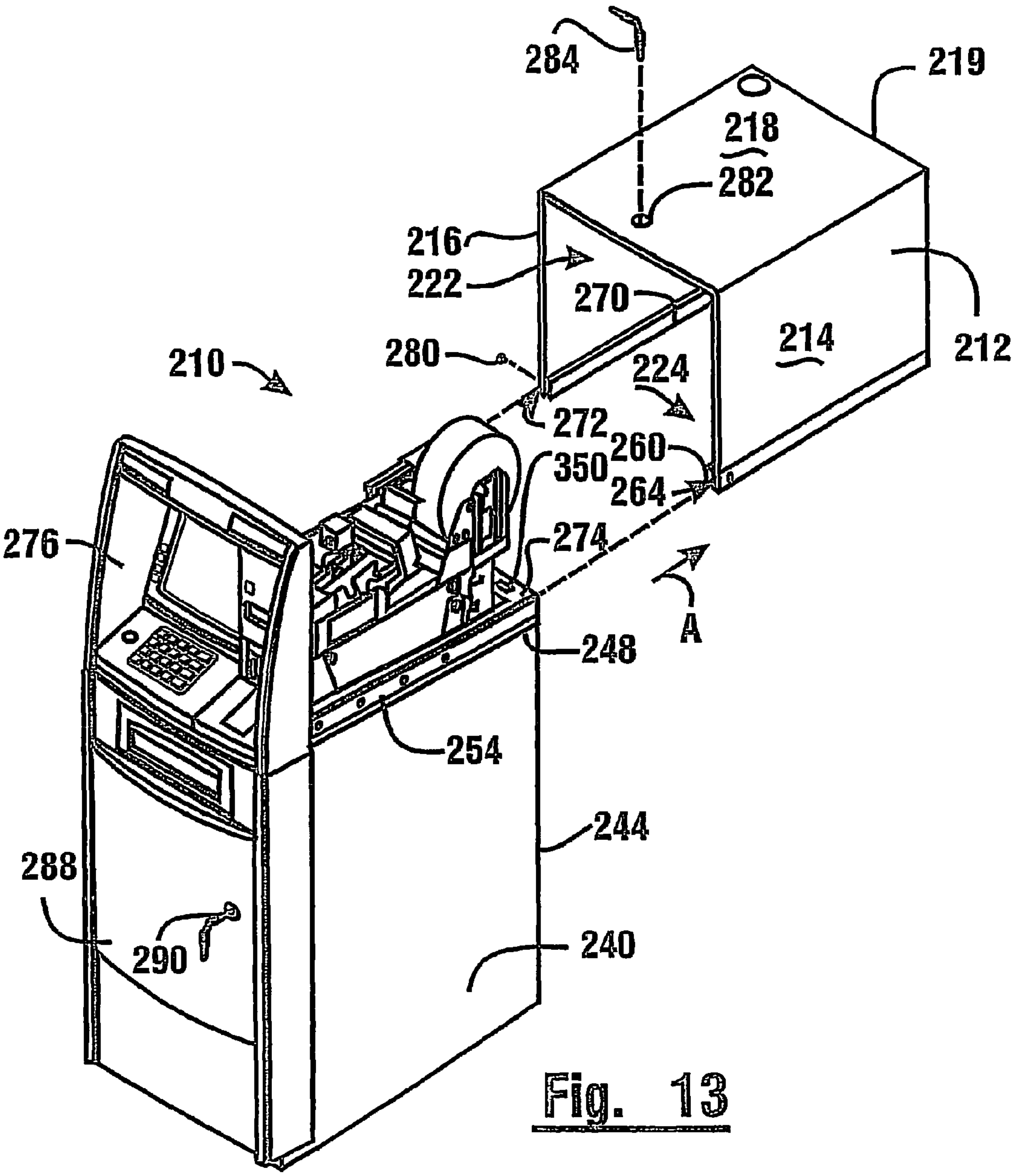
FIG. 13 is an isometric exploded view of an alternate embodiment of an automated banking machine.
Figure 14:
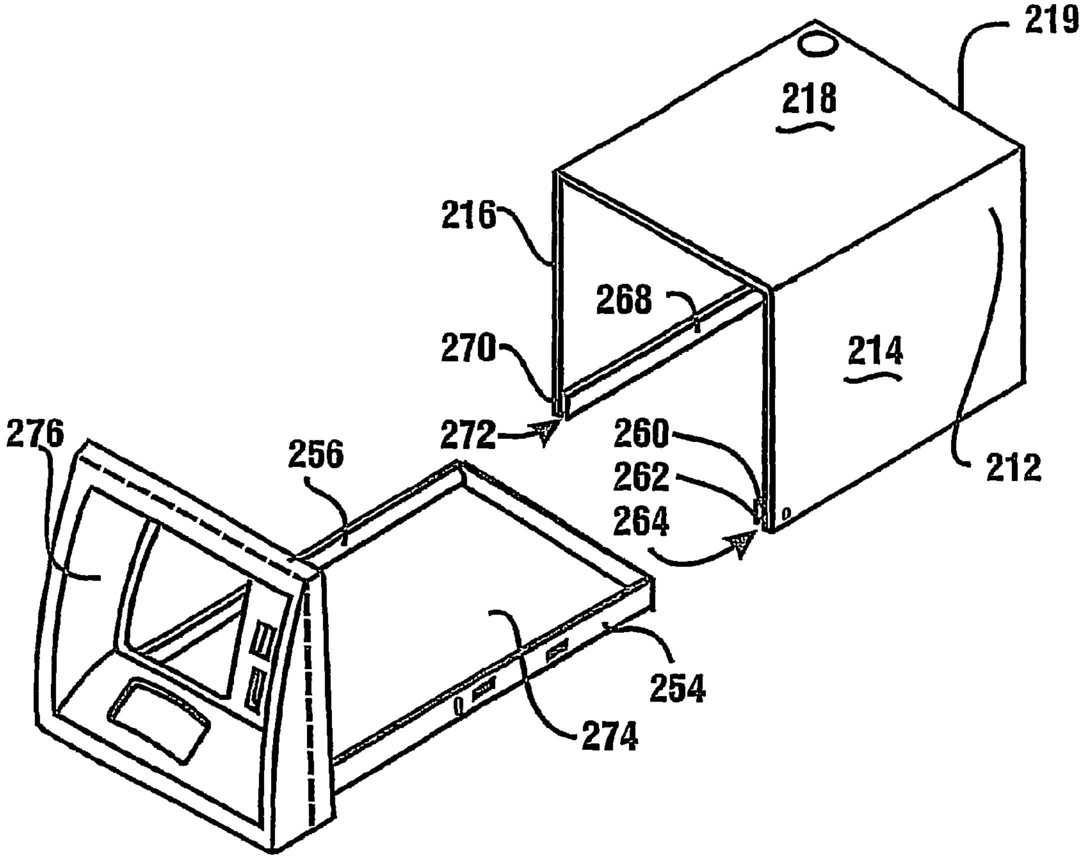
FIG. 14 is an isometric view of a top housing cover, a mounting tray and an upper fascia of an automated banking machine.
Figure 15:
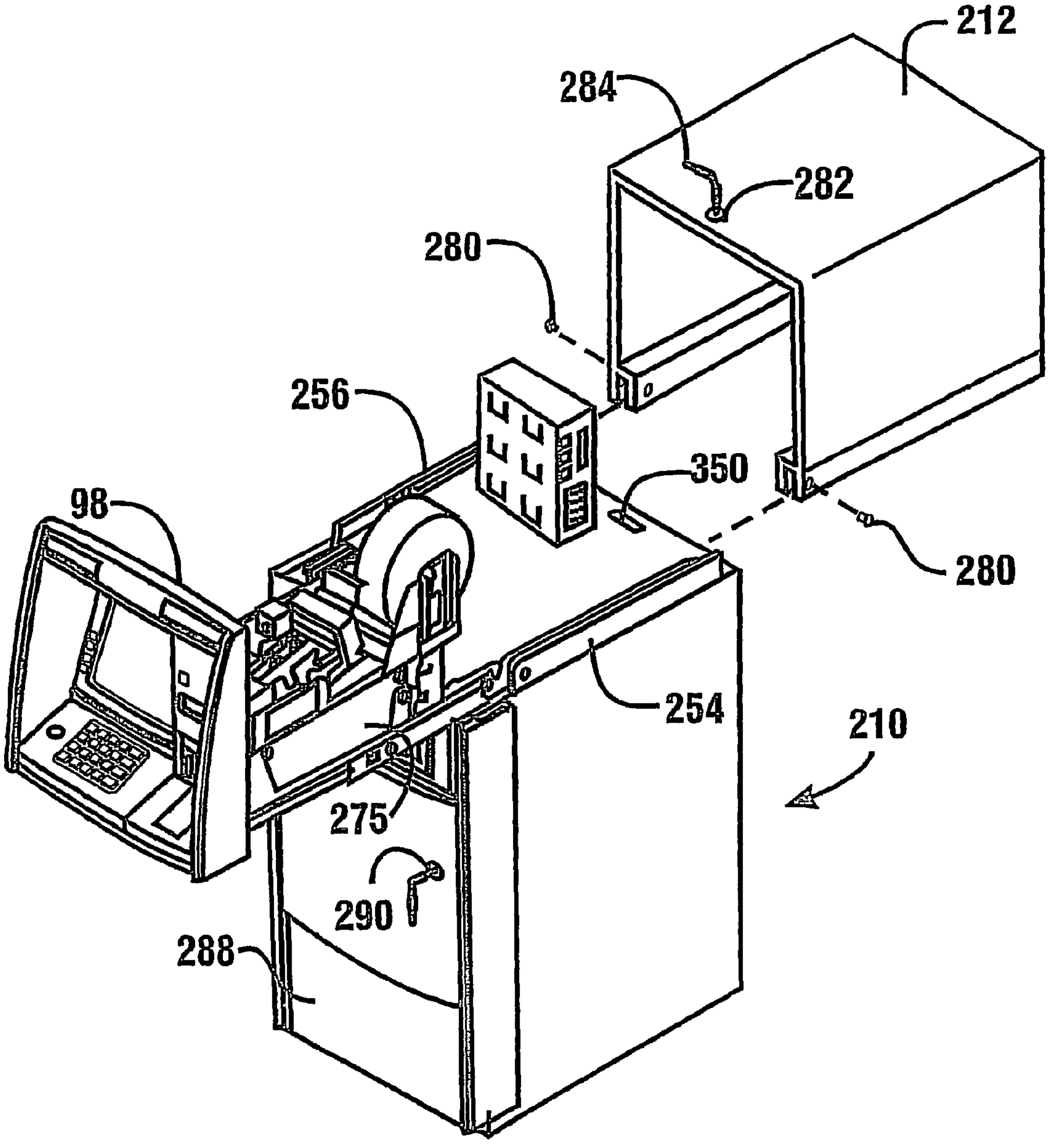
FIG. 15 is an isometric view of an alternate embodiment of an automated banking machine.

Yet another exemplary embodiment of an ATM 210 is illustrated in FIGS. 13-15. ATM 210 includes a top housing cover 212 including first and second side walls 214, 216, top wall 218, and rear wall 219. Top housing cover 212 defines a front opening 222 and a bottom opening 224. In a first (operable) position, top housing cover 212 covers an interior area in which various upper banking machine components such as a display, a receipt printer, a card reader, input keys, a controller, communication device, and others may be disposed.

In this exemplary embodiment, ATM 210 further includes a chest 240 bounding a secure area in a manner similar to that previously described. Chest 240 includes a housing 244 having a top wall 248. Top housing cover 212 is adapted for rearward slidable movement relative to top wall 248 to a second position for service.

In this exemplary embodiment, a first upwardly extending flange member 254 is mounted in supporting connection with top wall 248 along a first side thereof. A second upwardly extending flange member 256 (not shown in this view) is mounted in supporting connection with top wall 248 along a second side thereof.

Supported on the first side wall 214 of top housing cover 212 is a first cooperating channel member 260 having a pair of spaced downwardly extending projections 262 defining a first channel 264 therebetween. Likewise, on the second side wall 216 of top housing cover 212 there is supported a second cooperating channel member 268 having a pair of spaced downwardly extending projections 270 defining a second channel 272 therebetween.

Top housing cover 212 is adapted for slidable movement relative to the top wall 248 by the slidable engagement of the first flange member 254 within first channel 264 and the slidable engagement of the second flange member 256 within second channel 272.

In this exemplary embodiment, ATM 210 includes an upper fascia 276 operable to selectively cover the front opening 222. The top housing cover 212 is adapted for rearward movement relative to the top wall 248 in the direction of arrow A such that rearward displacement of the top housing cover 212 allows access to the upper banking machine components in the interior area, for example, for servicing.

It is contemplated that in exemplary embodiments the positioning of the flange members 254, 256 and the channels 264, 272 be reversed. For example, the top housing cover 212 may support flange members and the mounting tray may support cooperating channel members to accomplish a similar slidable relationship therebetween.

FIG. 14 illustrates an exemplary embodiment wherein the flange members 254, 256 are incorporated into a mounting tray 274 which is operable to receive and support one or more upper banking machine components, which for ease of illustration are not shown in this view. This embodiment allows for ease of assembly of the exemplary ATM 210. The applicable upper banking machine components can be readily mounted onto mounting tray 274, which is mounted in supporting connection with top wall 248 of chest housing 244. Top housing cover 212 may thereafter be positioned by slidable movement of flange members 254, 256 in respective channels 264, 272.

In an alternate exemplary embodiment, illustrated in FIG. 15, ATM 210 may include a rollout tray 275 similar to rollout tray 80 as previously described. Flange members 254, 256 may be mounted in supporting connection with rollout tray 275. Thus, upper banking machine components may be accessed by rearwardly sliding the top housing cover 212, extending the rollout tray 275, or a combination of both.

ATM 210 may further include at least one removable fastener 280 for selectively engaging the top housing cover 212 with at least one flange member 254, 256 to prevent relative slidable movement therebetween. In the exemplary embodiment, first and second fasteners 280 are used to secure the top housing cover 212.

ATM 210 may further include a first locking mechanism 282 to secure the top housing cover to upper fascia 276. In this exemplary embodiment, the locking mechanism is operable in response to a key 284. In the exemplary embodiment illustrated in FIG. 15 it is contemplated that fasteners 280 are covered by a rearwardly extending portion of upper fascia similar to portion 98 shown in FIG. 6. Thus, fasteners 280 are not accessible from outside the ATM until first locking mechanism 282 has been operated to release upper fascia 276 so that the upper fascia 276 can be moved away from top housing cover 212.

In the exemplary embodiment, ATM 210 may include a lower fascia 288 with features similar to a lower fascia previously described. Lower fascia 288 may be secured in the covering position by a second locking mechanism 290.

This exemplary embodiment provides ready access to the upper banking machine components, for example, for servicing or replacing. To access the upper banking machine components, fasteners 280 are removed. It is contemplated that in an exemplary embodiment, the fasteners may not be accessible until after the first locking mechanism 282 is unlocked and the upper fascia is displaced slightly to uncover fasteners 280. In other embodiments, the fasteners may be directly accessed.

The top housing cover 212 may then be moved rearwardly, away from upper fascia 276 so that the interior area is accessible. During servicing, the top housing cover 212 may be selectively positioned so that some portion or none of the upwardly extending flanges 254, 256 remain engaged with the channel members 260, 268, respectively.

In one exemplary embodiment, a method is provided for accessing banking machine components of an ATM. The exemplary method includes supporting the top housing cover in a slidable relationship with the top wall of the chest housing, wherein the top housing cover includes a front opening; selectively rearwardly sliding the top housing cover away from a first position in which an upper fascia covers the front opening; and accessing at least one upper banking machine component that is mounted in supporting connection with the top wall of the chest housing.

The exemplary method further includes removing fasteners that may be used to selectively secure the top housing cover in the first position.

The exemplary method further includes operating a locking mechanism to release the top housing cover and the upper fascia.

The exemplary method further includes accessing an upper banking machine component for servicing. The at least one upper banking machine component may be a display that is accessed for servicing.

In one embodiment the ATM includes side flange members mounted in supporting connection with a top wall of a chest housing and cooperative channel members mounted in supporting connection with the top housing cover. In this exemplary embodiment, the method further includes slideably engaging a first flange member with a first channel of a first channel member.

Figure 16:
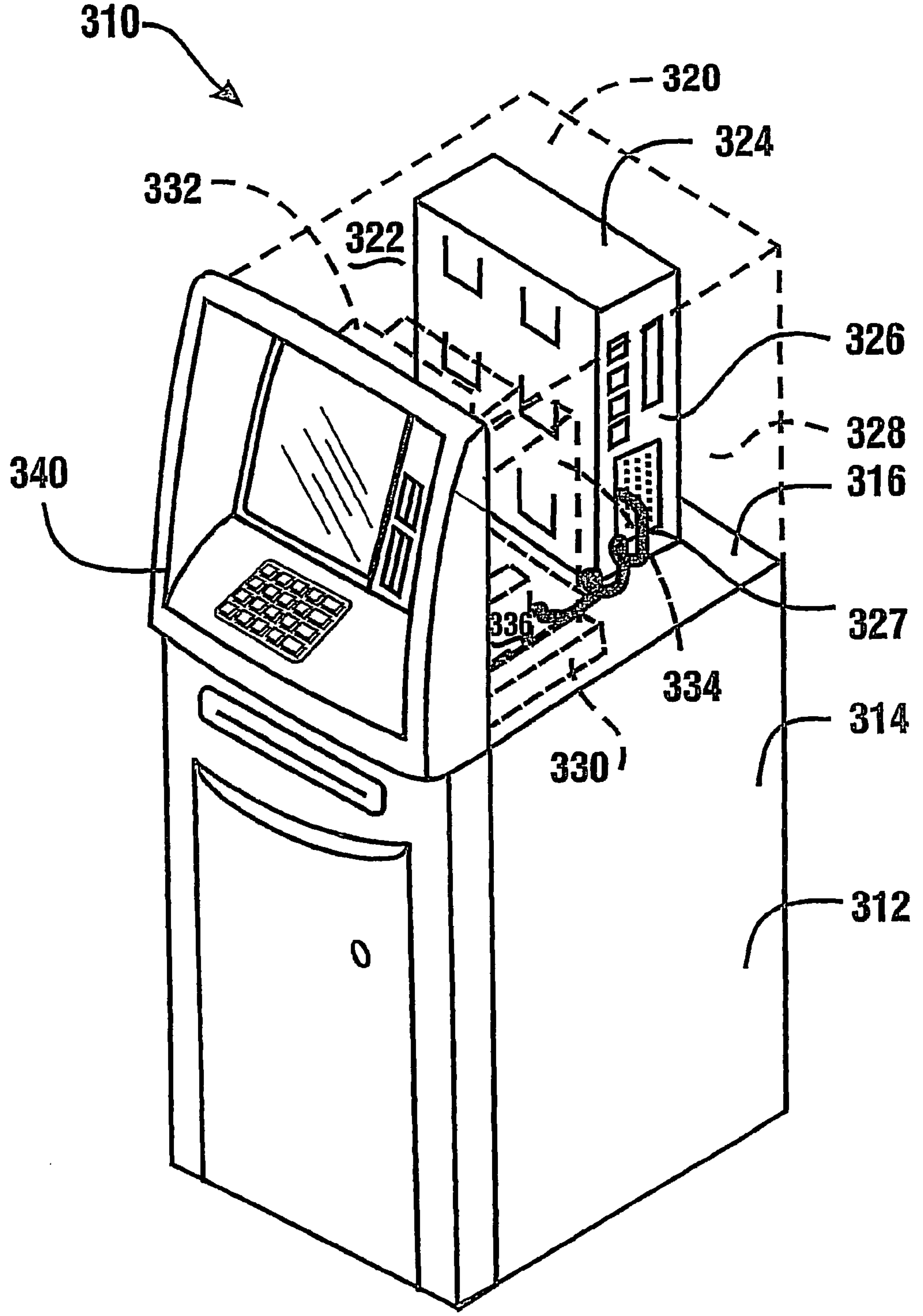
FIG. 16 is an isometric view, partly in phantom, of an alternate exemplary embodiment of an automated banking machine in an operational condition.
Figure 17:
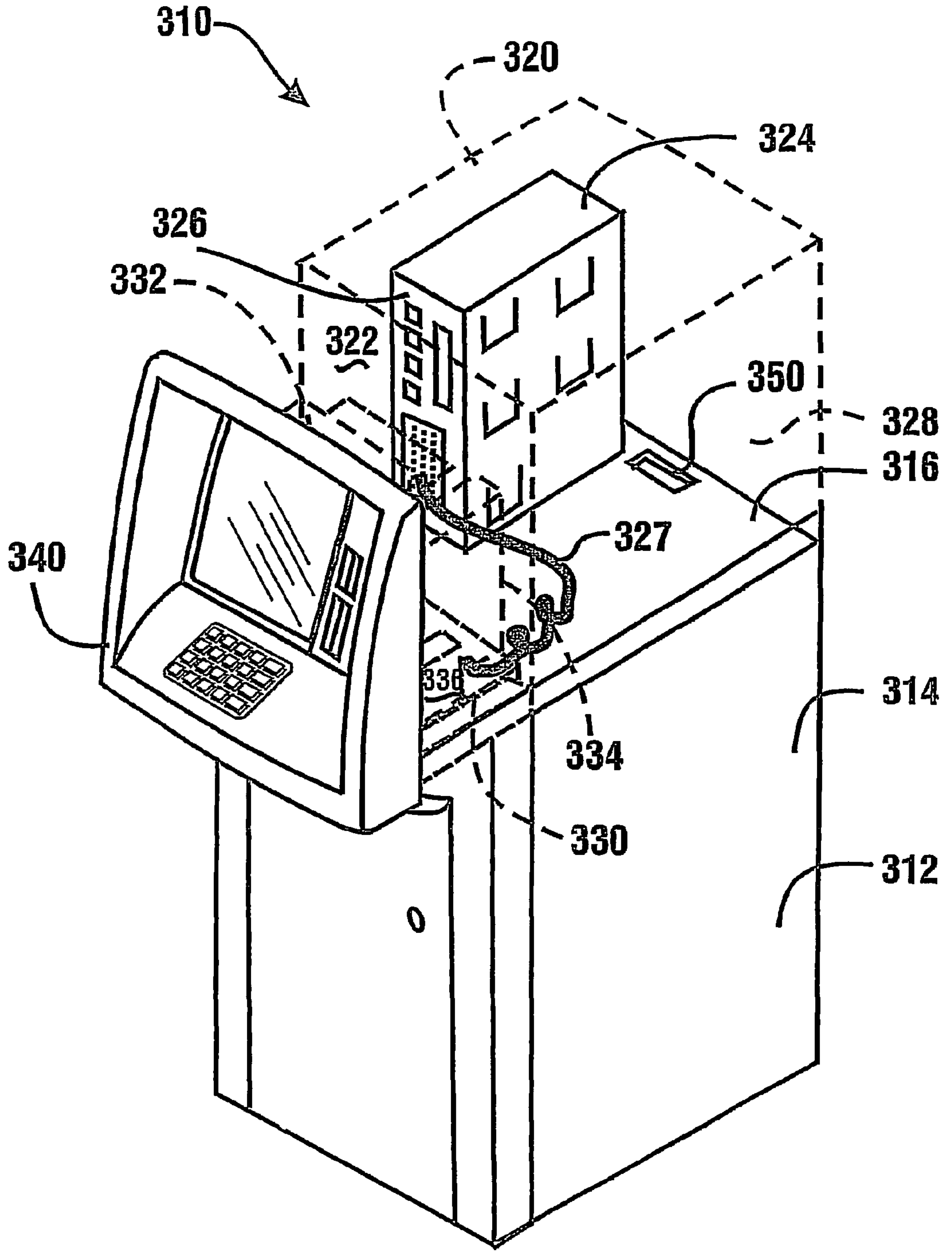
FIG. 17 is an isometric view, partly in phantom, of the automated banking machine of FIG. 16, in a serviceable condition.

In another exemplary embodiment, illustrated in FIGS. 16 and 17, ATM 310 may include a chest 312 having a chest housing 314 including top wall 316. As in previously described embodiments, chest housing 314 bounds a secure area which holds lower banking machine components including a currency dispenser mechanism which may be similar to mechanism 64 shown in FIG. 3. ATM 310 further includes a top housing 320 (shown in phantom) bounding an interior area 322.

In this exemplary embodiment, ATM 310 includes a processor case 324 that houses the primary ATM processor. The processor may be an Intel Pentium (PL type) or other type processor. Of course, in some embodiments the case may house multiple processor or no processors at all. The ATM processor causes operation of the various devices and mechanisms in the ATM.

In this exemplary embodiment, processor case 324 is in supporting connection with top wall 316 of chest housing 314. Processor case 324 includes a first functional side 326 that is operable to establish connections, such as through cable 327, from the various banking machine components. Other processor components, including but not limited to circuit cards having various functions, additional processors, drives (CD, DVD, floppy), power supplies, memory, or encryption cards, may be carried on or within processor case 324. Such components may also be accessed, removed and/or replaced and routine maintenance performed through access to the functional side of the processor case.

In order to minimize the space occupied by ATM 310, it is advantageous to orient processor case 324 of the exemplary embodiment so that the first functional side 326 is substantially parallel to a first side wall 328 (shown in phantom) of top housing 320. However, in order to easily access first functional side 326 for servicing or connecting cables, it is advantageous to orient processor case 324 so that the first functional side 326 is substantially perpendicular to the first side wall 328, facing the front opening of the ATM. In order to accomplish both these purposes, the processor case 324 of the exemplary embodiment is rotationally supported in connection with the top wall 316 of the chest housing. The processor case 324 is selectively rotationally movable between an operational position, shown in FIG. 17, wherein the first functional side 326 is substantially parallel to the first side wall 328, and a service position, shown in FIG. 16, wherein the first functional side 326 is substantially perpendicular to the first side wall 328.

In this exemplary embodiment, a rollout tray 330 is supported on the top wall 316 of the chest housing 314. As in earlier described exemplary embodiments, the rollout tray 330 is selectively movable between a retracted position wherein the rollout tray 330 is within the interior area 322, and an extended position wherein the rollout tray 330 extends outwardly from the interior area through a front opening in the top housing 320. In the exemplary embodiment, various upper banking machine components such as display 332, receipt printer 334, and card reader 336 are supported on rollout tray 330. Also, an upper fascia 340 may be mounted in supporting connection with rollout tray 330. As in other described embodiments, when the rollout tray is in the retracted position, the upper fascia 340 covers the front opening in the top housing.

In the exemplary embodiment, when rollout tray 330 is in the retracted position, as illustrated in FIG. 16, the processor case 324 is prevented from rotating from the operational position to the service position. When the rollout tray 330 is in the extended position, as illustrated in FIG. 17, there is enough clearance in the interior area 322 to permit the processor case 324 to be rotated into the service position. Thus, when the rollout tray 330 is in the extended position, the upper banking machine components supported thereon are readily accessible for service. Likewise, the cable connections and any processor components carried on the processor case are accessible for service.

In a method for servicing banking machine components of an ATM, a rollout tray 80 mounted in supporting connection with a top housing 320 is extended from a retracted position so that the rollout tray extends through a front opening in the top housing. The method includes disengaging any locking mechanisms that operate to retain the rollout tray in the retracted position.

A processor case 324 disposed in an interior area bounded by the top housing may be rotated from an operational position to a service position. At least one processor component mounted in supporting connection with the processor case may be accessed for servicing. After servicing of the processor component is complete, the processor case may be rotationally returned to the operational position from the service position. Thereafter, the rollout tray may be repositioned into the retracted position.

The step of servicing the processor component may include connecting or disconnecting cables or connections, adding or replacing components such as circuit cards, performing diagnostic tests and other functions to facilitate operation of the ATM.

Prior to repositioning the rollout tray, other banking machine components may be serviced while the rollout tray is extended. For example, a display, card reader, and receipt printer assembly are readily accessible for service. The service can include routine maintenance, replacement of non-working components, addition of other banking machine components, and the like. Connections with the processor can be readily made while the rollout tray is in the extended position and the processor case is in the service position.

The ATM may include a slidable top housing cover as earlier described. The service method includes the step of rearwardly sliding the top housing cover. After the servicing of banking machine components is completed, the method includes returning the top housing cover to an operational position.

During servicing of the ATM, the lower banking machine components may also be accessed for servicing. The service method includes disengaging any locking mechanisms that retain the lower fascia in a covering position. The lower fascia may thereafter be moved into the accessible position. The locking bolt mechanism that securely engages the chest door with the chest housing may be disengaged so that the chest door may be placed in the open position.

An exemplary method further includes the step of engaging the chest door with the lower fascia when the chest door is in the open position and the lower fascia is in the accessible position in order to retain the door in the open position.

The lower banking machine may include components or modules, such as currency stacker, currency dispenser mechanism, and currency delivery mechanism (as shown in FIG. 3). An exemplary service method includes performing routine maintenance, replenishing currency, removing sheets, disengaging sheets from the currency dispenser mechanism, replacing components and the like.

The ATM can include connections and/or cables that extend between the processor case and lower banking machine components that are generally housed within the secure chest. The chest housing may include various openings 350 through the walls to accommodate the connections and/or cables (FIGS. 10-11 and 17). When the processor case is in the service position, the connections can be readily established, maintained and/or changed.

An exemplary method of constructing an ATM apparatus is provided. The exemplary method includes mounting a top housing in supporting connection with a chest adapted for use in an automated banking machine apparatus. A first chest door is operable to selectively close a first opening in the chest housing.

The method further includes mounting an upper fascia in supporting connection with the top housing and mounting a lower fascia in movable supporting connection with the chest housing.

The upper fascia and the top housing are selectively positioned relative each other so that a front opening in the top housing is selectively covered by the upper fascia, and wherein a rearwardly extending portion of the upper fascia overlies a forward region of the top housing.

The lower fascia is selectively positioned in a covering position relative a chest door wherein a first side extension of the lower fascia overlies a first forward portion of the chest housing and wherein a second side extension of the lower fascia overlies a second forward portion of the chest housing.

In an exemplary method, a lower edge surface of the upper fascia is placed in substantially parallel alignment with an upper edge surface of the lower fascia and an end edge of a rearwardly extending portion of the upper fascia is substantially vertically aligned with an end edge of a first side extension of the lower fascia at a first side of the ATM.

In an exemplary method, a second chest door is moveably mounted in supporting connection with the chest housing to operably close a second opening in the chest housing. A first locking bolt mechanism may be mounted to the first chest door and an alternate securing mechanism may be mounted to the second chest door.

In an exemplary method, a processor case is mounted in supporting rotational connection with a top wall of the chest housing wherein the processor case is selectively movable between an operational position and a service position, and wherein the processor case houses at least one processor.

In an exemplary method, the lower fascia is equipped with an inwardly extending flange operate to selectively engage the chest door when the lower fascia is in the accessible position and the chest door is in the open position.

Figure 18:
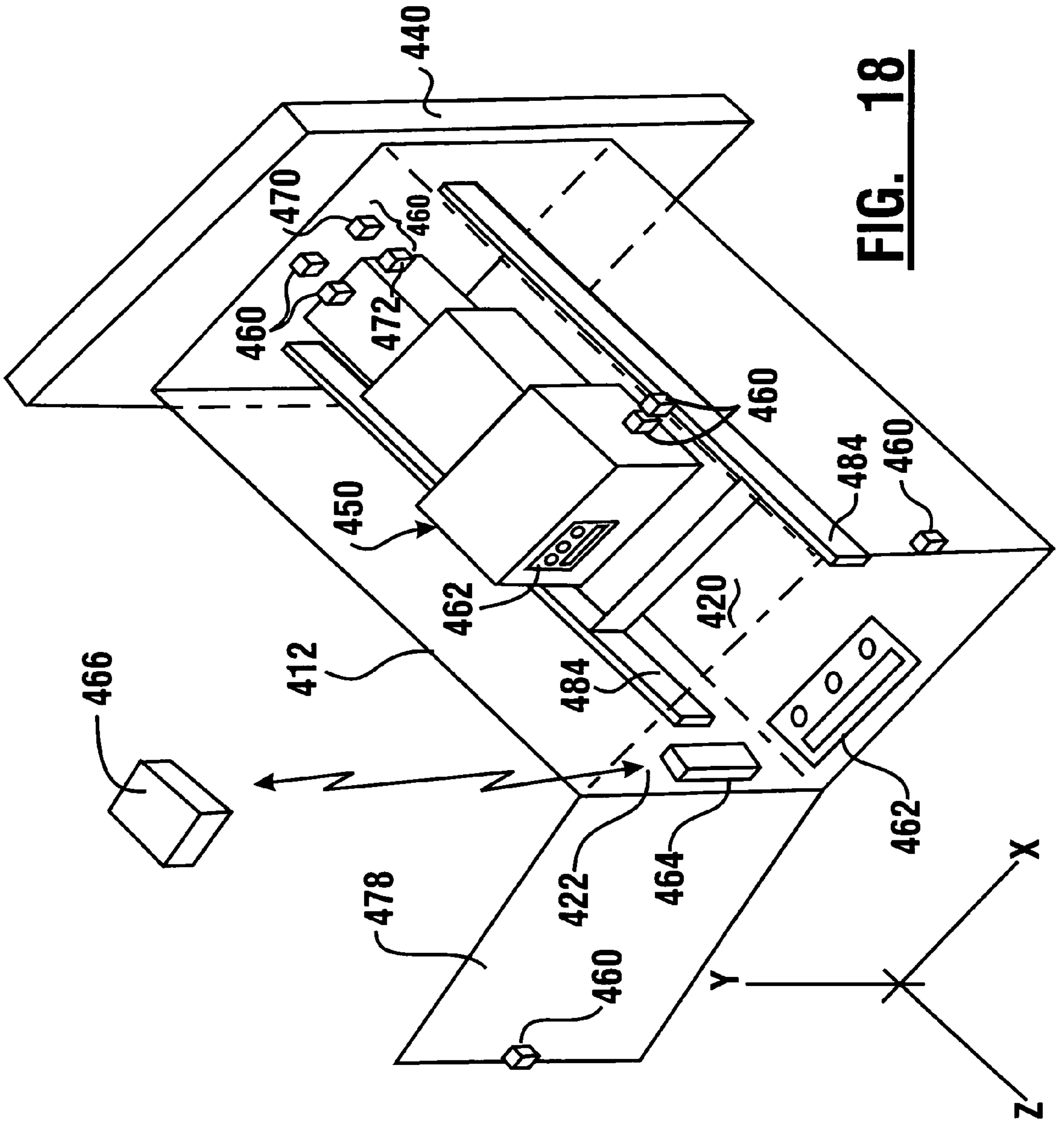
FIG. 18 is a side schematic view of an automated banking machine illustrating various exemplary banking machine components, and components indicating the positions of one or more modules of the machine.

FIG. 1 illustrates generally an exemplary automated banking machine which is an automated teller machine (ATM) 10. FIG. 18 is an illustration of a portion of an automated banking machine showing an exemplary embodiment. A housing 412 bounds an interior area 420 and includes an opening 422 to the interior area 420. A door 478, capable of at least partially covering the opening 422, is moveably mounted, generally on hinges, but other attachment methods may be used, or the door 478 may be removable from the housing 412. Included in operatively supported connection with the housing 412 are at least one module, shown generally as module 450. As will be seen generally in FIG. 3, such modules in an exemplary embodiment may include a card reader 24, a display 28, and a cash dispenser 64, each in operatively supported connection with the housing 412. The card reader 24 is operative to read indicia on user cards corresponding to financial accounts. Other embodiments may include a check acceptor or a bill recycler, for example.

The module 450 is moveably mounted in operatively supported connection with the housing 412, shown in exemplary fashion on slides 484 in FIG. 18. The module 450 is moveable between an operative position in which it is positioned in an operative position within the housing 412, and a service position. In the service position, the module 450 extends in and at least partially through the opening 422 to allow access to more areas of the module for servicing by a servicer. In the operative position, it may be necessary to align the module 450 with various openings in the front of the ATM 10 (best seen in FIG. 2), connectors, transports or other structures. Such alignment may be beneficial to the reliable and efficient operation of the ATM. If the module 450 is not correctly aligned and positioned within the housing 412, resultant misalignment and gaps may cause malfunctions and/or compromise the security of the ATM 10 as well as contribute to malfunctions and customer inconvenience. Alignment of the module with the fascia 440 may also be desirable for similar or different reasons.

Referring to FIG. 18, exemplary alignment parameters for an exemplary module include vertical (up-down, "Y" in Cartesian coordinate space), lateral horizontal (left-right, "X" in Cartesian coordinate space), and in-out (forward-backward, "Z" in Cartesian coordinate space). At least one first position sensor 460 is operative to sense a position of a first portion of the module 450. At least one indicator 462, is operative to indicate the status of the sensor 460 and provides at least one visual output indicative that the first portion of the module 450 is in a position that corresponds to the operative position of the module. Likewise, in exemplary fashion, second and third position sensors 460 may also be included to sense other portions of the module 450 disposed from the first portion as well as from one another. In the exemplary embodiment each position sensor is in operative connection with a respective visual indicator. The status of the additional sensors 460 may further be indicated by one or more outputs from indicators 462. Alternatively in other embodiments plural sensors may be in operative connection with one or more common indicators that provide outputs indicative of respective portions of a module.

In operation, the sensors 460 communicate with circuitry which causes the indicators 462, to visually show when each of the portions of module 450 is properly positioned. In an exemplary embodiment, the sensors 460, in cooperation with the indicators 462, are used to guide the servicer in moving and positioning the module after servicing and/or in adjusting the alignment of the module 450, for proper operation. For example, lights, which may be, for example, LEDs (light emitting diodes), may indicate red when a particular alignment parameter for a module portion is sensed by the corresponding sensor as out-of-limit or out of proper position and green when the respective sensor portion of the module 450 is properly positioned relative to the housing 412 and the fascia 440 to permit proper operation. Of course such indicators are exemplary and in other embodiments, other types of visual and/or audible output devices may be used.

In a further exemplary embodiment, the door 478 may also be in operative connection with at least one position sensor 460 to sense, and in cooperation with the indicator 462, indicate, that the door 478 is properly aligned and closed over the housing opening 422. In some embodiments the door or other housing portion may include a window or similar structure to enable viewing one or more indicators within the machine, from the outside of the housing. In other embodiments indicators may be mounted on the housing so as to be visible on the outside of the housing. These approaches are exemplary and in other embodiments other approaches may be used.

The sensors 460 may be of various types, for example a reed switch, vane sensor, Hall effect sensor, magneto-resistive sensor, variable reluctance sensor, inductive sensor, infrared sensor or opto-electronic sensor may be used. Vane sensors may be adjustable by suitable firmware or circuitry that controls the output devices to compensate for decreased output and can provide reasonably tight tolerances. In a further exemplary embodiment, sensors 460 may include first 470 and second 472 elements such an emitter and a receiver of signals, respectively. Such signals may be radiation either in the visible or not visible range, sonic signals or signals of other types. Each sensor 460 within a single housing 412 for sensing different module portions need not be of the same type. As can be appreciated, sensors of a particular type may be especially suitable for a particular application. The sensors 460 may communicate with the circuitry that causes outputs from indicators 462 wirelessly or by being hard wired. Additionally, one or more indicators 462 may be included in a single unit to show conditions of multiple sensors or each indicator 462 may show the status of only one movable portion and one sensor 460. The indicators may be operatively supported on the module as shown, or in other embodiments may be located elsewhere in and/or supported by the housing of the machine. Of course these approaches are exemplary.

In a further exemplary embodiment, a sensor 460, either directly or through the indicator 462, communicates with at least one local processor 464 in the machine. In some embodiments each module 450 may have its own local processor 464, or an ATM 10 could have one or more local processors 464. Further, the local processor 464 may cause the machine to communicate with a remote processor 466. The remote processor may be included in a remote computer at a location disposed from the ATM. Thus, for example, module position, module alignment and door status may be communicated to a remote location to trigger appropriate actions, such as alarms or a request for servicing.

While an exemplary module 450 is shown, numerous types of modules may be made to provide an indication that the module is not in proper operative position or that the module requires alignment, using associated sensors 460 and indicators. Exemplary modules may include a card reader 24, a display 28, a cash dispenser 64, a printer 30 (FIG. 3), a bill recycler and a check acceptor.

In an exemplary method, the housing door 478 is unlocked. From a closed position the door is moved to an open position and the module 450 extended at least partially from the housing interior area 420 through the housing opening 422 to a position suitable for servicing by a servicer. A service activity is conducted on the module 450 while it is extended in the opening 422. Such service activity may include, but is not limited to, replenishing cash, replacing journal printer paper, replacing receipt paper, and/or replenishing other consumables on the module, removing and replacing at least a portion of the module 450, replacing parts, adjusting portions of the module 450, and other types of service activities. Following servicing, the module 450 is moved by a servicer toward its operative position within the housing 412. While moving the module 450 toward its operative position, it is determined by the circuitry in operative connection with the plurality of sensors whether each respective portion of the module 450 is, or is not, sensed by each sensor as in a position corresponding to the operative position. In an exemplary embodiment the output devices provide one or more visual outputs indicative of the position of a plurality of disposed areas on the module. The servicer may observe the condition of the module in the areas of sensors 460 as indicated by the indicator and/or indicators 462 as the servicer moves the module toward the operative position. In an exemplary embodiment a visual indication as to whether each sensor senses the associated portion of the module in a respective position that corresponds to an operative position of the module is provided. In the exemplary embodiment the indicators comprise a respective indicator corresponding to each sensor, which indicates via a change in color output whether a corresponding portion of the module has reached its corresponding operative position. In exemplary embodiments a processor in operative connection with the sensors is operative to provide outputs through a readout display panel to assist a servicer in positioning the module in accordance with programmed instructions. When the servicer has moved the module to the operative position as indicated by all the indicators, the servicer may cease efforts to move the module. If the module is not sensed as fully in the operative position, adjustments to the position of the module 450 are made to position the module 450 so as to place the module in the operative position. This may be done responsive to the color indicators and/or indicia corresponding to instructions output through the readout display panel which indicate to the servicer how to move the module or portion thereof (or move adjusting screws or other members) to place the module in the operative position. In a further exemplary embodiment, the status of the position of the module 450 is sent through operation of the local processor in the banking machine to a remote computer 466. Of course this approach is exemplary.

In a further exemplary embodiment, a method is provided including sensing a position of a module 450 relative to a housing 412 of an automated banking machine 10 (FIG. 3). The automated banking machine 10 includes a card reader 24 (FIG. 3) operative to read cards including data corresponding to financial records, a display 28 (FIG. 3), and a cash dispenser 64 (FIG. 3). The automated banking machine includes circuitry that is operative to communicate the position of the module 450 or one or more portions thereof relative to the housing 412, to a remote computer 466. See, generally, FIG. 18. Thus, misalignment of sensed portions, components or areas on a module 450 in the automated banking machine 10 may be made known at a location remote from the automated banking machine 10. Such misalignment, for example, may be the result of damage to the automated banking machine 10 by accident, servicer error or by malicious tampering. Appropriate action may then be taken.

While the exemplary embodiments include particular structures to achieve the desirable results, those having skill in the art may devise numerous other embodiments with other structures which employ the same principles described herein and which are encompassed by the subject matter as claimed.

Thus the exemplary embodiments achieve at least some of the above stated objectives, eliminate difficulties encountered in the making and use of prior devices, solve problems, and attain the desirable results described herein.

In the foregoing description certain terms have been used for brevity, clarity, and understanding. However, no unnecessary limitations are to be implied therefrom because such terms are for descriptive purposes and are intended to be broadly construed. Moreover, the descriptions and illustrations herein are given by way of examples and the invention is not limited to the exact details shown and described.

In the following claims any feature described as a means for performing a function will be construed as encompassing any means capable of performing the recited function, and will not be deemed limited to the particular means shown as performing that function in the foregoing description or mere equivalents thereof.

Having described the features, discoveries, and principles of the invention, the manner in which it is constructed and operated, and the advantages and useful results attained; the new and useful structures, devices, elements, arrangements, parts, combinations, systems, operations, methods, and relationships are set forth in the appended claims.

I claim:

1. Apparatus comprising:

an automated banking machine that operates responsive to data read from user cards to carry out financial transactions, the machine including:
- a housing,
  - wherein the housing bounds an interior area,
  - wherein the housing includes an opening to the interior area;
- a card reader in operatively supported connection with the housing, wherein the card reader is operative to read indicia on user cards corresponding to financial accounts;
- a door moveably mounted in operatively supported connection with the housing, wherein the door is moveable between a closed position in which the door at least partially covers the opening, and an open position;
- a display in operatively supported connection with the housing;
- a cash dispenser in operatively supported connection with the housing;
- a manually movable module mounted in operatively supported connection with the housing,
  - wherein the module is moveable between an operative position within the interior area and a module service position, wherein in the module service position, at least a portion of the module is out of the interior area and extends outward relative to the opening, wherein in the module service position, the at least a portion is accessible to a service person servicing the machine, wherein in the operative position, the module is positioned for machine operation, wherein in the operative position, the at least a portion is in the interior area and does not extend outward relative to the opening, wherein in the operative position and with the door in the closed position, the at least a portion is inaccessible to the service person, wherein the module includes a first portion;

a first position sensor, wherein the first position sensor is in operatively supported connection with at least one of the housing and the module, wherein with the module in the operative position, the first position sensor is operative to sense the first portion in a first position;

at least one first indicator in operatively supported connection with at least one of the housing and the module, wherein the at least one first indicator is in operative connection with the first position sensor, wherein the at least one first indicator is visible to the service person while the module is being manually moved from the module service position toward the operative position, wherein the at least one first indicator is operative responsive at least in part to sensing by the first position sensor, to provide at least one visible output indicative that the first portion is in the first position.

2. The apparatus according to claim 1, wherein the module includes a second portion, wherein the second portion is disposed from the first portion, and further comprising:

a second position sensor in operatively supported connection with at least one of the housing and the module, and wherein in the operative position of the module, the second position sensor is operative to sense the second portion in a second position, at least one second indicator in operatively supported connection with at least one of the housing and the module, wherein the at least one second indicator is in operative connection with the second position sensor, wherein the at least one second indicator is visible to the service person while the module is being manually moved from the module service position toward the operative position, wherein the at least one second indicator is operative responsive at least in part to sensing by the second position sensor, to provide at least one visible output indicative that the second portion is in the second position.

3. The apparatus according to claim 2, wherein the module includes a third portion, wherein the third portion is disposed from both the first portion and the second portion, and further comprising:

a third position sensor in operatively supported connection with at least one of the housing and the module, wherein in the operative position of the module, the third position sensor is operative to sense the third portion in a third position, at least one third indicator in operatively supported connection with at least one of the housing and the module, wherein the at least one third indicator is in operative connection with the third position sensor, wherein the at least one third indicator is visible to the service person while the module is being manually moved from the module service position toward the operative position, wherein the at least one third indicator is operative responsive at least in part to sensing by the third position sensor to provide at least one visible output indicative that the third portion is in the third position.

4. The apparatus according to claim 3 and further comprising a readout display panel, and wherein the at least one first indicator, the at least one second indicator, and the at least one third indicator are in operative connection with the readout display panel, wherein the readout display panel is operative to indicate a position of at least one of the first, second and third portions of the module.

5. The apparatus according to claim 3, and further comprising:

a fourth position sensor in operatively supported connection with the housing, wherein, with the door in the closed position, the fourth position sensor is operative to sense the door in the closed position; and at least one fourth indicator in operatively supported connection with the housing, wherein the fourth position sensor is in operative connection with the fourth position sensor, and wherein the at least one fourth indicator is operative responsive to the fourth position sensor to provide at least one output indicative that the door is in the closed position.

6. The apparatus according to claim 1 wherein the first position sensor is includes at least one of a reed switch, a vane sensor, a Hall effect sensor, magneto-resistive sensor, variable reluctance sensor, inductive sensor, infrared sensor, and opto-electronic sensor.

7. A method carried out with an automated banking machine that operates responsive to data bearing records, comprising:

(a) manually moving a module of the automated banking machine to cause the module to be extended outward relative to an opening in a housing of the machine, wherein while extended outward relative to the opening, the module is accessible to a service person servicing the machine, wherein the machine includes a card reader operative to read data from user cards, including data corresponding to financial accounts, a display, and a cash dispenser;

(b) conducting by a service person servicing the machine, service activity on the module while it is extended outward relative to the opening;

(c) subsequent to (b), manually moving the module toward an operative position within the housing until at least one visual output from at least one first indicator in operative connection with a first position sensor in operatively supported connection with at least one of the module and the housing, visually indicates that the module is in the operative position, wherein the at least one first indicator is visible to the service person while the module is being manually moved toward the operative position, wherein in the operative position, the module is positioned for machine operation, wherein in the operative position, the module is not extended outward relative to the opening.

8. The method of claim 7, wherein the machine includes a door moveably mounted in operatively supported connection with the housing, wherein the door is moveable between a closed position in which the door at least partially covers the opening, and an open position, and further comprising:

(d) moving the door to the open position, wherein in the open position the module is movable through the opening.

9. The method according to claim 7 wherein in (c) the first position sensor is operative to sense a first portion of the module in an operative position, and wherein the module includes a second portion disposed from the first portion, wherein (c) includes moving the module toward the operative position until at least one second indicator in operative connection with a second position sensor in operatively supported connection with at least one of the module and the housing, visually indicates responsive to the second position sensor, that the second portion is sensed in a position corresponding to the operative position of the module.

10. The method according to claim 9 wherein the module includes a third portion disposed form both the first portion and the second portion, wherein (c) includes moving the module toward the operative position until at least one third indicator in operative connection with a third position sensor in operatively supported connection with at least one of the module and the housing, visually indicates responsive to the third position sensor, that the third portion of the module is sensed in a position corresponding to the operative position of the module.

11. Apparatus comprising:

an automated banking machine including:

a user data reader, a moveably mounted module, wherein the module is manually moveable by a service person during a machine servicing operation, between an inward operating position and an outward servicing position, wherein the module includes a first module portion, wherein the first module portion is aligned in the machine when the module is properly positioned in the inward operating position, wherein the module includes a second module portion, wherein the second module portion is aligned in the machine when the module is properly positioned in the inward operating position, wherein the second module portion differs from the first module portion, a plurality of sensors, including at least one first sensor and at least one second sensor, wherein the at least one first sensor is operably located to sense when the first module portion is aligned in the machine, wherein the at least one second sensor is operably located to sense when the second module portion is aligned in the machine;

at least one display device, wherein the at least one display device includes a plurality of indicators, including at least one first indicator and at least one second indicator, wherein the at least one first indicator is operable responsive at least in part to the at least one first sensor sensing that the first module portion is aligned in the machine, to provide at least one visible output indicative of first module portion alignment, wherein the at least one second indicator is operable responsive at least in part to the at least one second sensor sensing that the second module portion is aligned in the machine, to provide at least one visible output indicative of second module portion alignment, wherein the at least one second indicator differs from the at least one first indicator, wherein both the at least one first indicator and the at least one second indicator are service person viewable while the module is being manually moved from the outward servicing position toward the inward operating position, wherein the at least one first indicator and the at least one second indicator are service person usable in verifying that the module is properly positioned in the inward operating position.

12. The apparatus according to claim 11 wherein the module includes at least one of the user data reader, a user display usable by a machine user, a cash dispenser, a printer, a check acceptor, and a currency bill recycler.

13. The apparatus according to claim 11 wherein both the at least one first indicator and the at least one second indicator are viewable by the service person while the module is being manually moved by the service person from the outward servicing position toward the inward operating position, wherein both the at least one first indicator and the at least one second indicator provide visual indication to the service person on whether the module is being properly moved into the inward operating position.

14. The apparatus according to claim 11 wherein the plurality of sensors includes at least one third sensor, wherein the plurality of indicators includes at least one third indicator, wherein the module includes a third module portion, wherein the third module portion is aligned in the machine when the module is properly positioned in the inward operating position, wherein the third module portion differs from both the first module portion and the second module portion, wherein the at least one third indicator is operable responsive at least in part to the at least one third sensor sensing that the third module portion is aligned in the machine, to provide at least one visible output indicative of third module portion alignment, wherein the at least one third indicator differs from both the at least one first indicator and the at least one second indicator, wherein the at least one third indicator is service person viewable while the module is being manually moved from the outward servicing position toward the inward operating position.

15. The apparatus according to claim 11 wherein the machine includes the at least one display device, wherein the at least one display device comprises at least one servicer display usable by a service person, wherein the at least one servicer display includes the at least one first indicator and the at least one second indicator, wherein the machine includes at least one user display usable by a machine user in carrying out a transaction, wherein the at least one servicer display differs from the at least one user display, wherein the machine includes at least one computer, wherein the at least one computer is in operative connection with the at least one first sensor, the at least one second sensor, and the at least one servicer display, wherein the at least one computer is operable responsive at least in part to receiving at least one signal from the at least one first sensor indicative that the first module portion is aligned in the machine, to cause the at least one first indicator to provide the at least one visible output indicative of first module portion alignment, wherein the at least one computer is operable responsive at least in part to receiving at least one signal from the at least one second sensor indicative that the second module portion is aligned in the machine, to cause the at least one second indicator to provide the at least one visible output indicative of second module portion alignment.

16. The apparatus according to claim 11 wherein the at least one visible output indicative of first module portion alignment, comprises a first visible color, wherein the at least one first indicator is operable to provide at least one other visible output indicative of first module portion non alignment, wherein the at least one other visible output comprises a second visible color, wherein the second visible color differs from the first visible color.

17. The apparatus according to claim 16 wherein the at least one visible output indicative of second module portion alignment, comprises a third visible color, wherein the at least one second indicator is operable to provide at least one other visible output indicative of second module portion non alignment, wherein the at least one other visible output comprises a fourth visible color, wherein the fourth visible color differs from the third visible color.

18. The apparatus according to claim 17 wherein the first visible color and the third visible color comprise the same color, wherein the second visible color and the fourth visible color comprise the same color.

19. A method comprising:

(a) manually moving by a service person during an automated banking machine servicing operation, a module of the machine from an outward servicing position toward an inward operating position, wherein the module includes a first module portion, wherein the first module portion is aligned in the machine when the module is properly positioned in the inward operating position, wherein the module includes a second module portion, wherein the second module portion is aligned in the machine when the module is properly positioned in the inward operating position, wherein the second module portion differs from the first module portion, wherein the machine includes a user data reader, a plurality of sensors, including at least one first sensor and at least one second sensor, wherein the at least one first sensor is operably located to sense when the first module portion is aligned in the machine, wherein the at least one second sensor is operably located to sense when the second module portion is aligned in the machine; and (b) viewing by the service person through at least one display device, whether movement of the module in (a) causes the module to be properly positioned in the inward operating position, wherein the at least one display device includes a plurality of indicators, including at least one first indicator and at least one second indicator, wherein the at least one first indicator is operable responsive at least in part to the at least one first sensor sensing that the first module portion is aligned in the machine, to provide at least one visible output indicative of first module portion alignment, wherein the at least one second indicator is operable responsive at least in part to the at least one second sensor sensing that the second module portion is aligned in the machine, to provide at least one visible output indicative of second module portion alignment, wherein the at least one second indicator differs from the at least one first indicator, wherein both the at least one first indicator and the at least one second indicator are service person viewable while the module is being manually moved from the outward servicing position toward the inward operating position, wherein the at least one first indicator and the at least one second indicator are service person usable in verifying that the module is properly positioned in the inward operating position.

20. The method according to claim 19 wherein both the at least one first indicator and the at least one second indicator are viewable by the service person while the module is being manually moved by the service person from the outward servicing position toward the inward operating position, wherein both the at least one first indicator and the at least one second indicator provide visual indication to the service person on whether the module is being properly moved into the inward operating position, wherein (b) includes viewing the at least one display device while the module is being moved in (a).

* * * * *